US012646816B2

(12) United States Patent
Kim et al.

(10) Patent No.: US 12,646,816 B2
(45) Date of Patent: Jun. 2, 2026

(54) MOUNTING APPARATUS FOR ANTENNA DEVICE ON ROOFTOP

(71) Applicant: KMW INC., Hwaseong-si (KR)

(72) Inventors: Duk Yong Kim, Yongin-si (KR); Hee Kim, Osan-si (KR); Min Sik Park, Hwaseong-si (KR); Kyo Sung Ji, Hwaseong-si (KR); Chi Back Ryu, Hwaseong-si (KR); In Ho Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 73 days.

(21) Appl. No.: 18/542,507

(22) Filed: Dec. 15, 2023

(65) Prior Publication Data

US 2024/0136697 A1 Apr. 25, 2024

Related U.S. Application Data

(63) Continuation of application No. PCT/KR2022/008380, filed on Jun. 14, 2022.

(30) Foreign Application Priority Data

Jun. 15, 2021 (KR) ........................ 10-2021-0077708
Jun. 18, 2021 (KR) ........................ 10-2021-0079652
(Continued)

(51) Int. Cl.
*H01Q 1/12* (2006.01)
*E04D 13/00* (2006.01)
(Continued)

(52) U.S. Cl.
CPC ............... *H01Q 1/12* (2013.01); *E04D 13/00* (2013.01); *H01Q 3/08* (2013.01); *F16B 5/02* (2013.01)

(58) Field of Classification Search
CPC .... F16B 5/02; H01Q 1/12; H01Q 3/08; E04D 13/00
See application file for complete search history.

(56) References Cited

U.S. PATENT DOCUMENTS 2,717,751 A * 9/1955 Kusiv .................. H01Q 1/1221
248/539
5,982,340 A * 11/1999 Troche ................. H01Q 1/1214
343/890
(Continued)

FOREIGN PATENT DOCUMENTS

CN 208399693 U 1/2019
JP 2003-069322 A 3/2003
(Continued)

OTHER PUBLICATIONS

International Search Report mailed Sep. 15, 2022 for International Application No. PCT/KR2022/008380 and its English translation.
(Continued)

*Primary Examiner* — Monica E Millner

(57) ABSTRACT

The present invention relates to a mounting apparatus for an antenna device and, specifically, comprises: a horizontal mounting panel coupled to the bottom surface of an antenna device; and an antenna installation unit on which the horizontal mounting panel is coupled and in which a hollow cable installation space is provided, wherein the antenna device enable left-right steering adjustment and up-down tilting adjustment by means of the horizontal mounting panel, and thus installation convenience and regulatory standards can be satisfied.

14 Claims, 26 Drawing Sheets

(30)　　　Foreign Application Priority Data

Jun. 18, 2021　(KR) ........................ 10-2021-0079653
Jun. 13, 2022　(KR) ........................ 10-2022-0071539

(51)　Int. Cl.
　　*H01Q 3/08*　　　(2006.01)
　　*F16B 5/02*　　　(2006.01)

(56)　　　　　References Cited

U.S. PATENT DOCUMENTS

| | | | |
|---|---|---|---|
| 6,058,299 A | 5/2000 | Lyseng | |
| 8,928,549 B2 * | 1/2015 | McDonnell .......... | H01Q 1/1221 |
| | | | 343/895 |
| 11,437,702 B2 * | 9/2022 | Han ..................... | H01Q 1/1221 |
| 11,784,389 B2 * | 10/2023 | Liu ...................... | H01Q 1/1228 |
| | | | 343/702 |

| | | | |
|---|---|---|---|
| 2011/0187624 A1 * | 8/2011 | Lettkeman ............... | H01Q 1/12 |
| | | | 343/882 |
| 2015/0372379 A1 * | 12/2015 | Zhao ...................... | H01Q 1/246 |
| | | | 343/841 |

FOREIGN PATENT DOCUMENTS

| | | | |
|---|---|---|---|
| JP | 2013-090054 A | 5/2013 | |
| KR | 10-1048636 B1 | 7/2011 | |
| KR | 10-2020-0006926 A | 1/2020 | |
| KR | 10-2020-0024091 A | 3/2020 | |
| KR | 10-2020-0097011 A | 8/2020 | |

OTHER PUBLICATIONS

European Search Report dated May 23, 2025 from European Patent Office for Application No. 22825267.2.

* cited by examiner

[FIG. 1A]
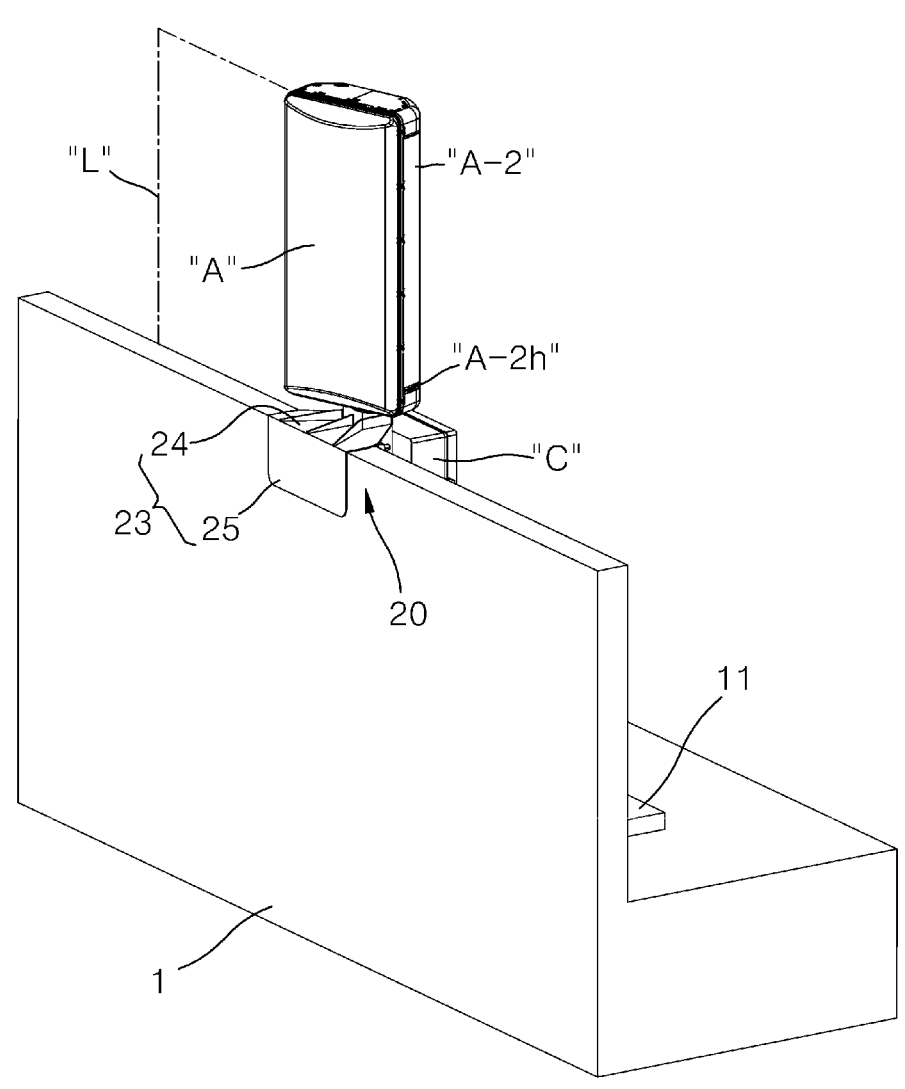

[FIG. 1B]
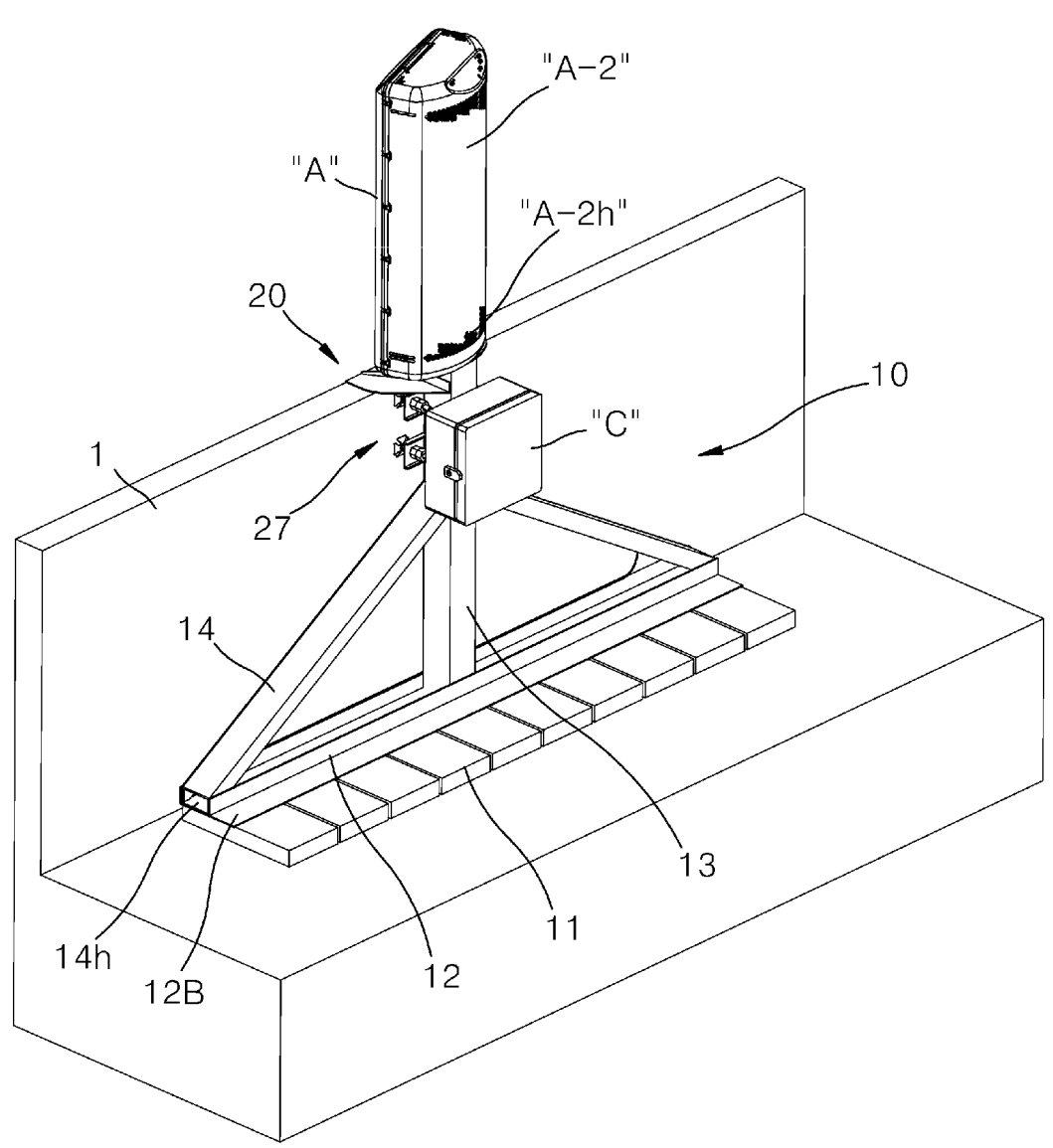

[FIG. 2]
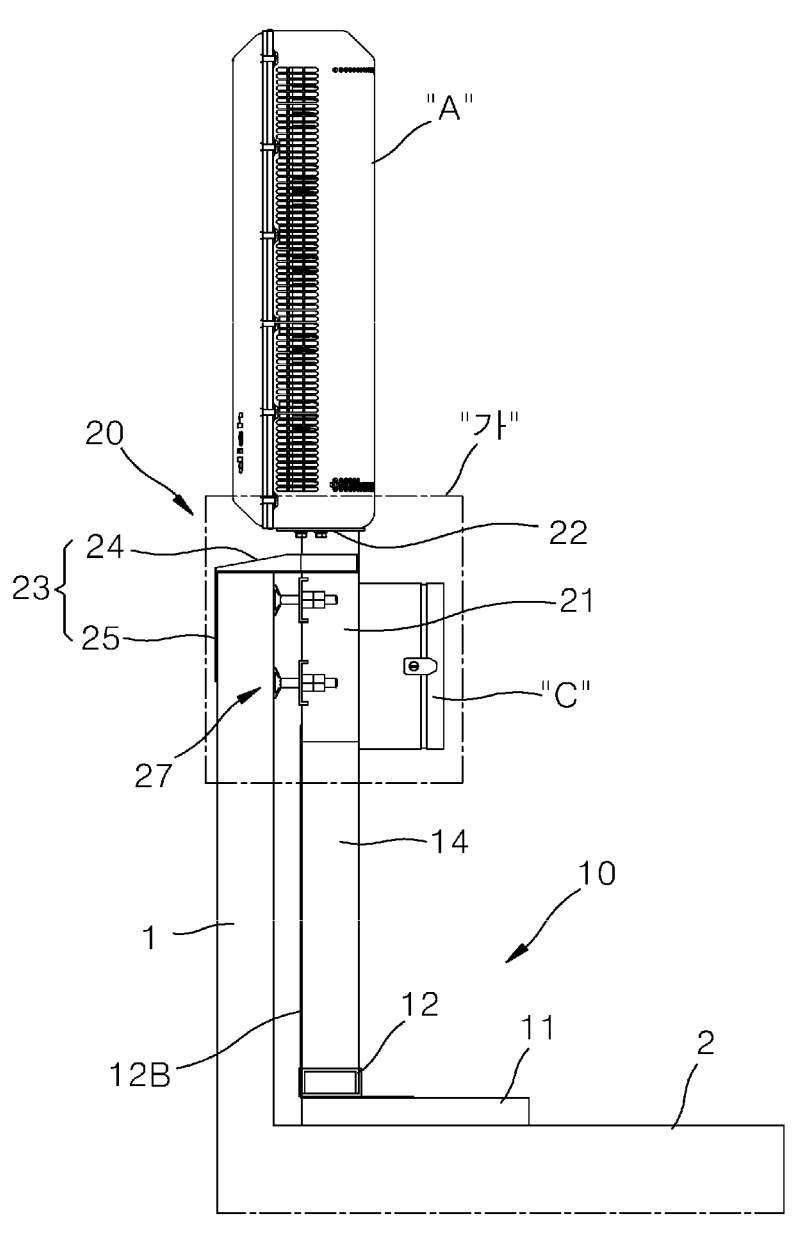

[FIG. 3]
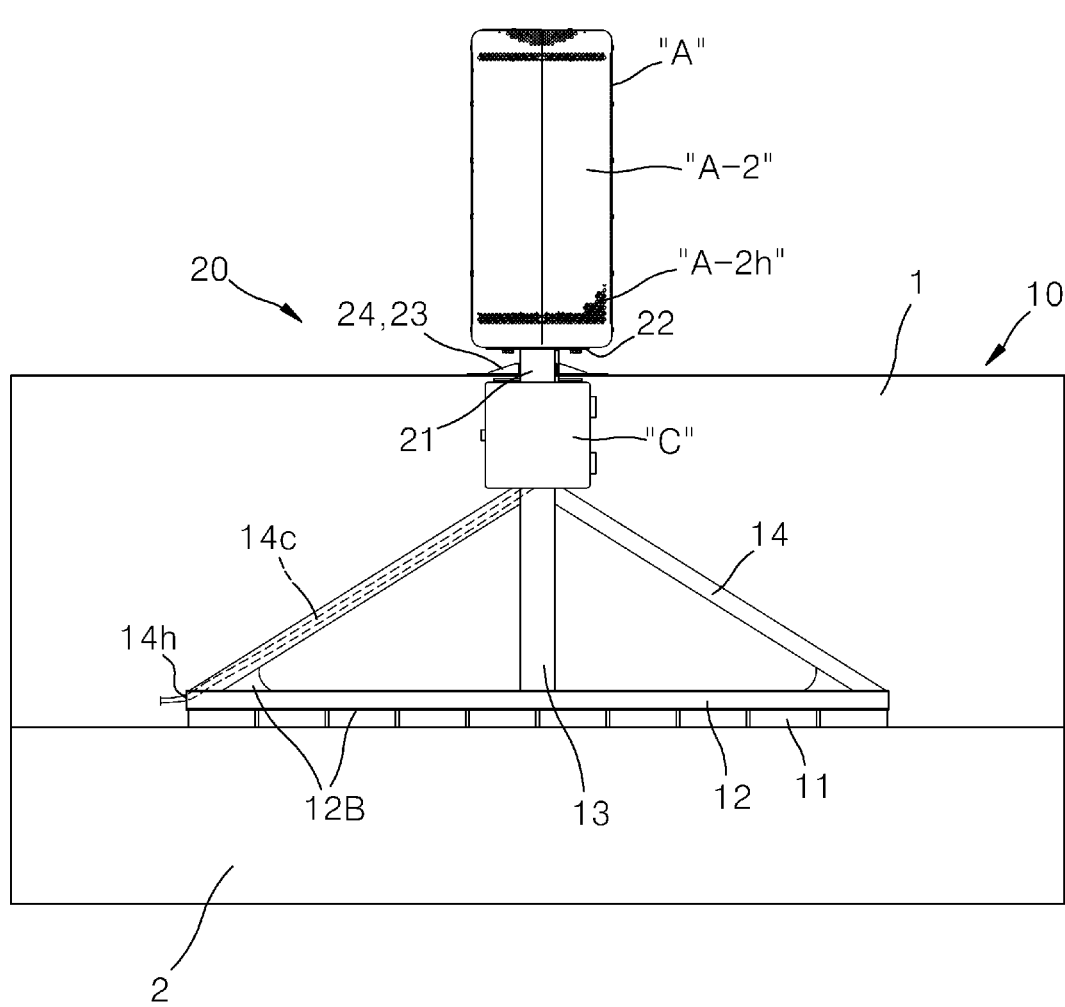

[FIG. 4]
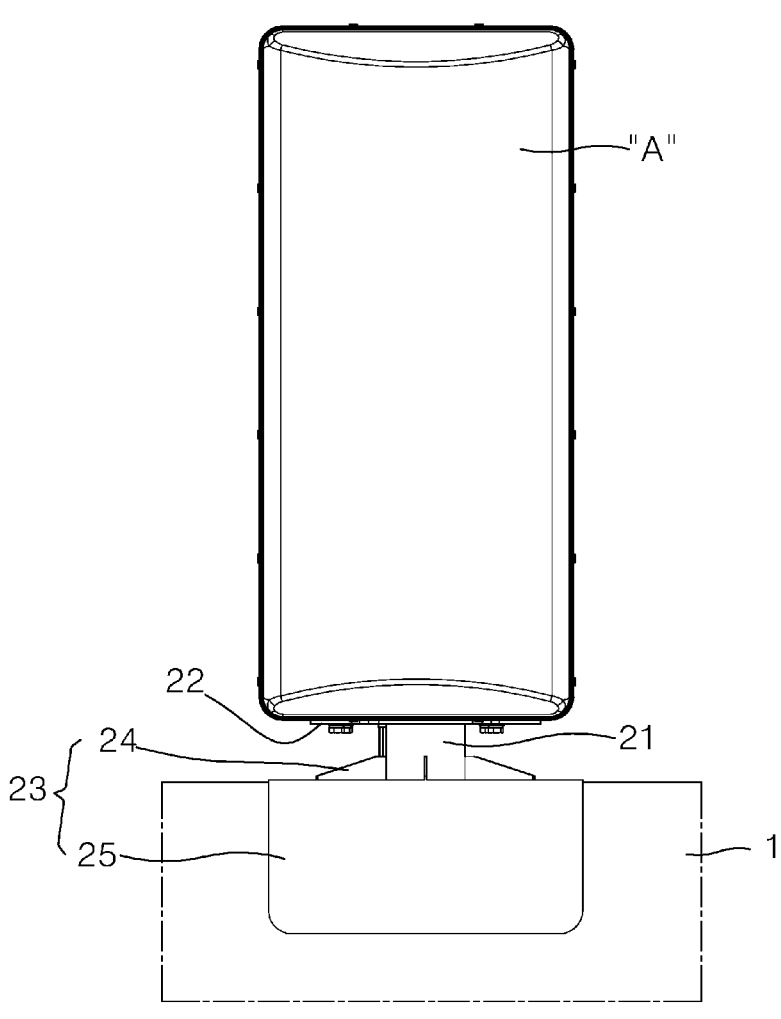

[FIG. 5A]
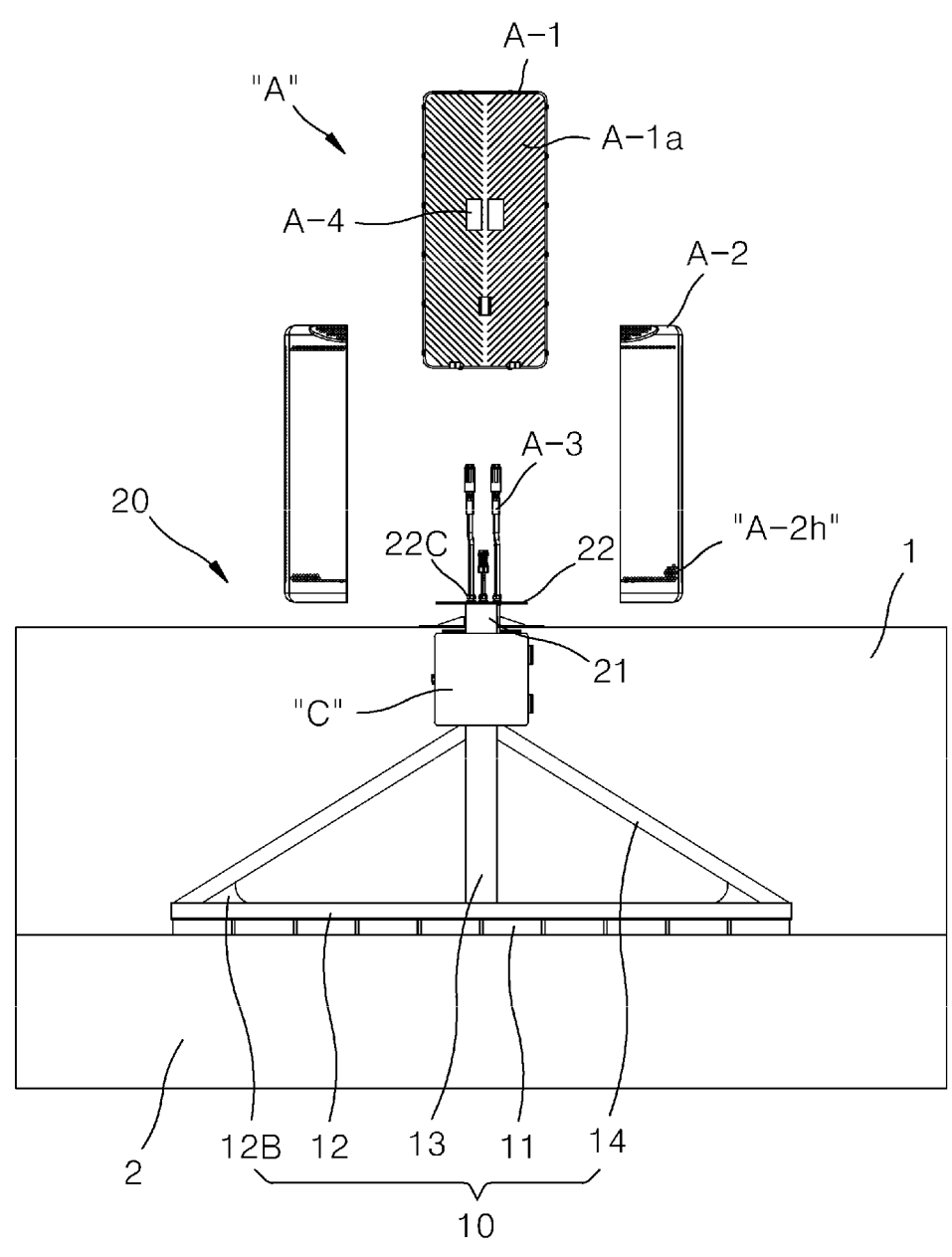

[FIG. 5B]
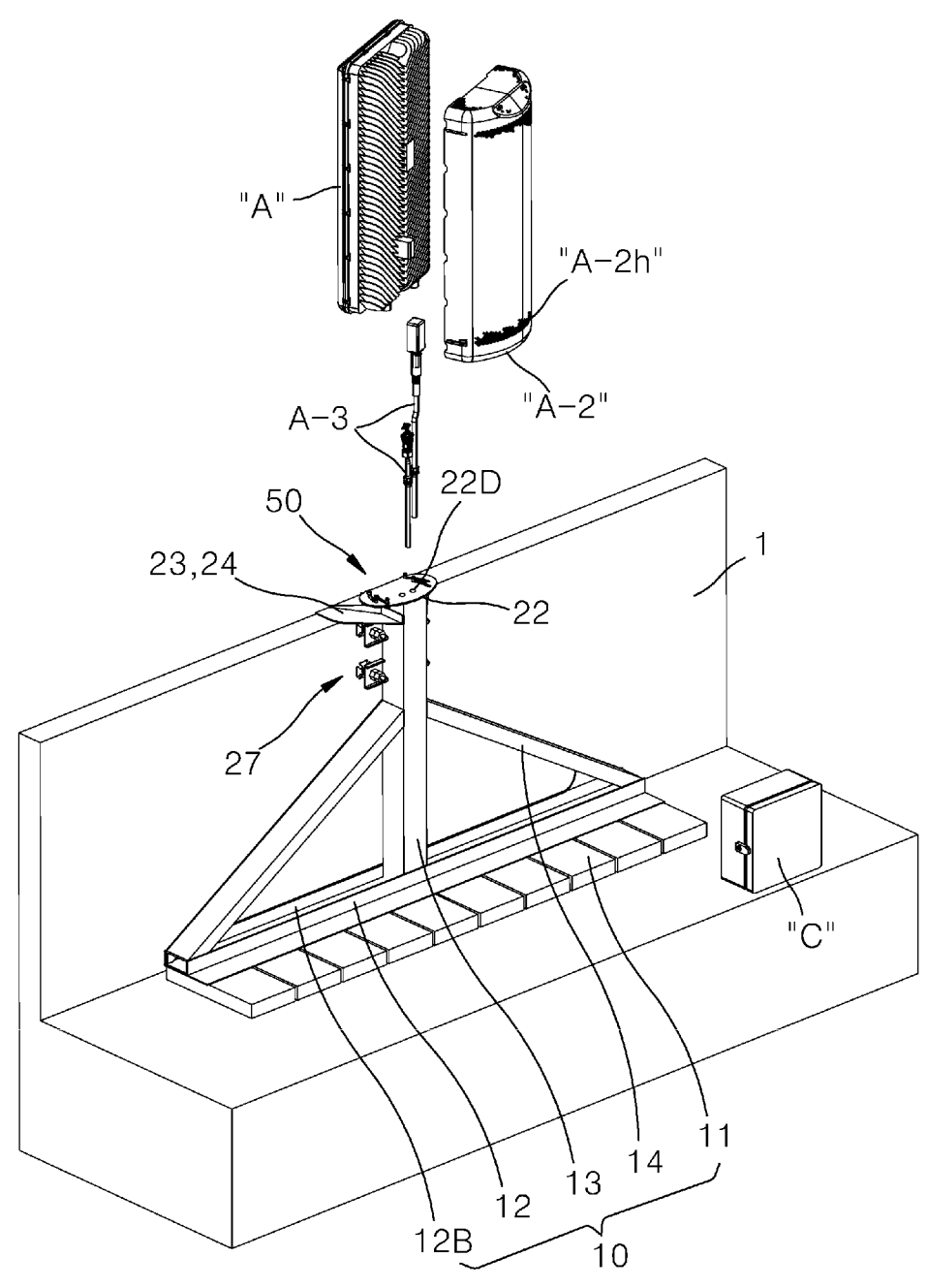

[FIG. 5C]
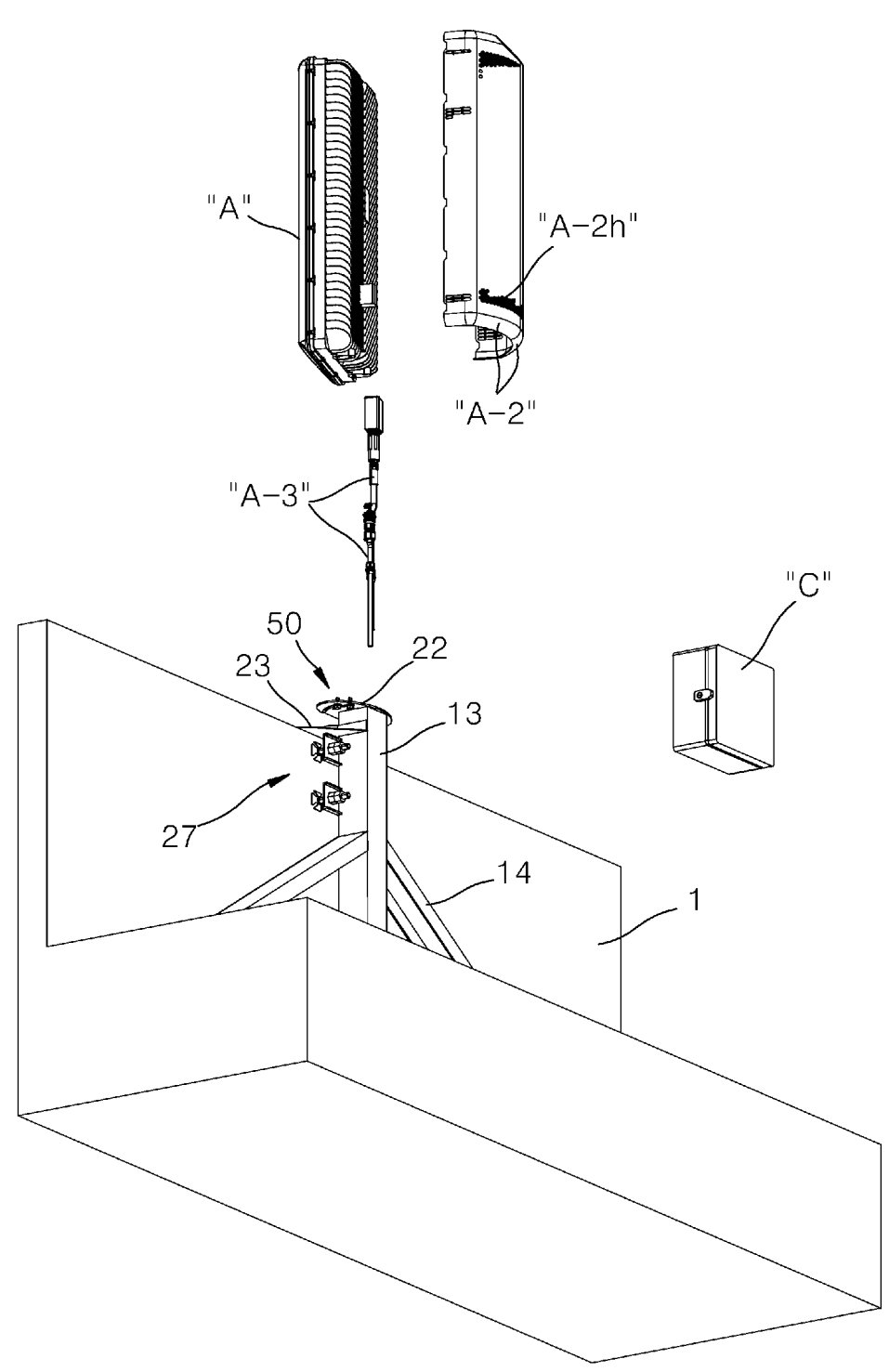

[FIG. 6]
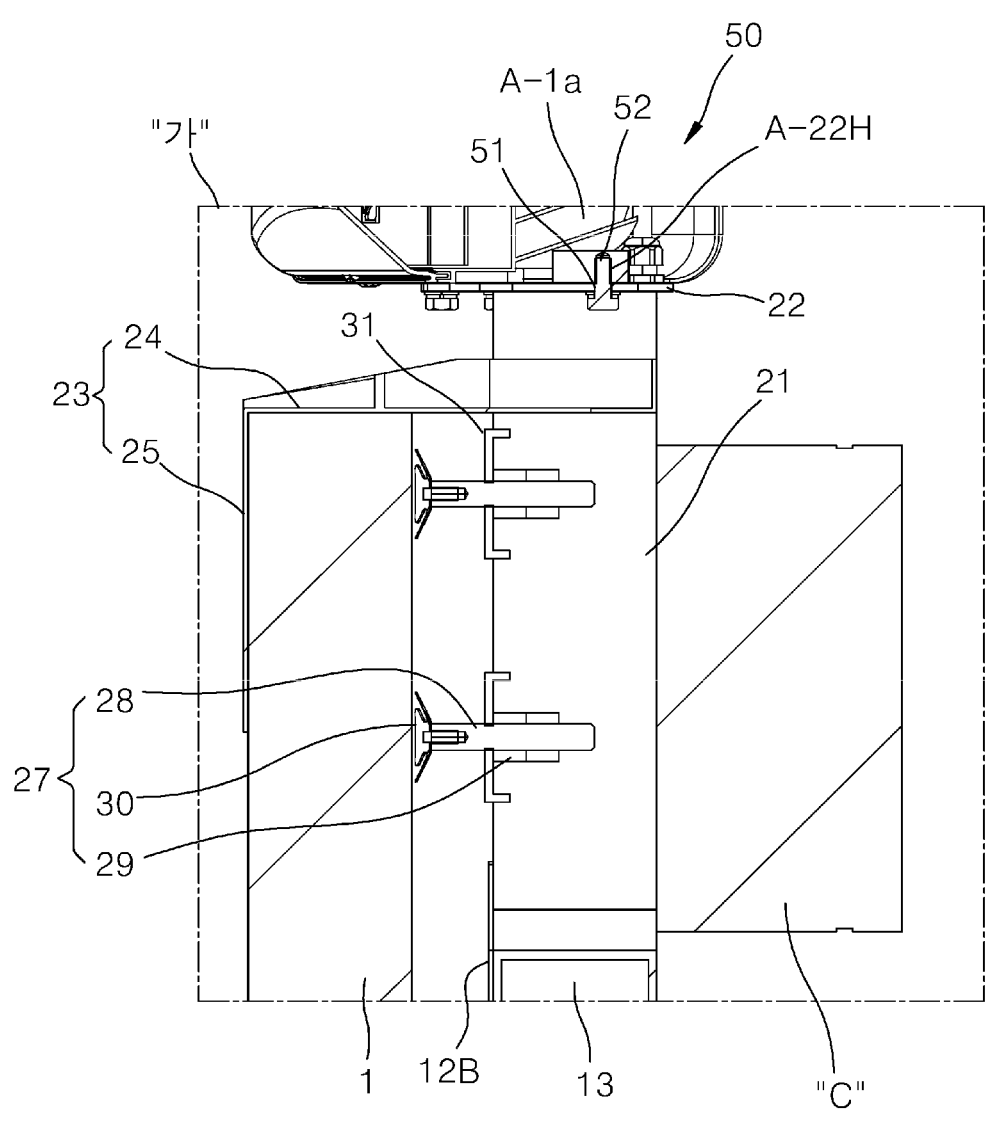

[FIG. 7A]
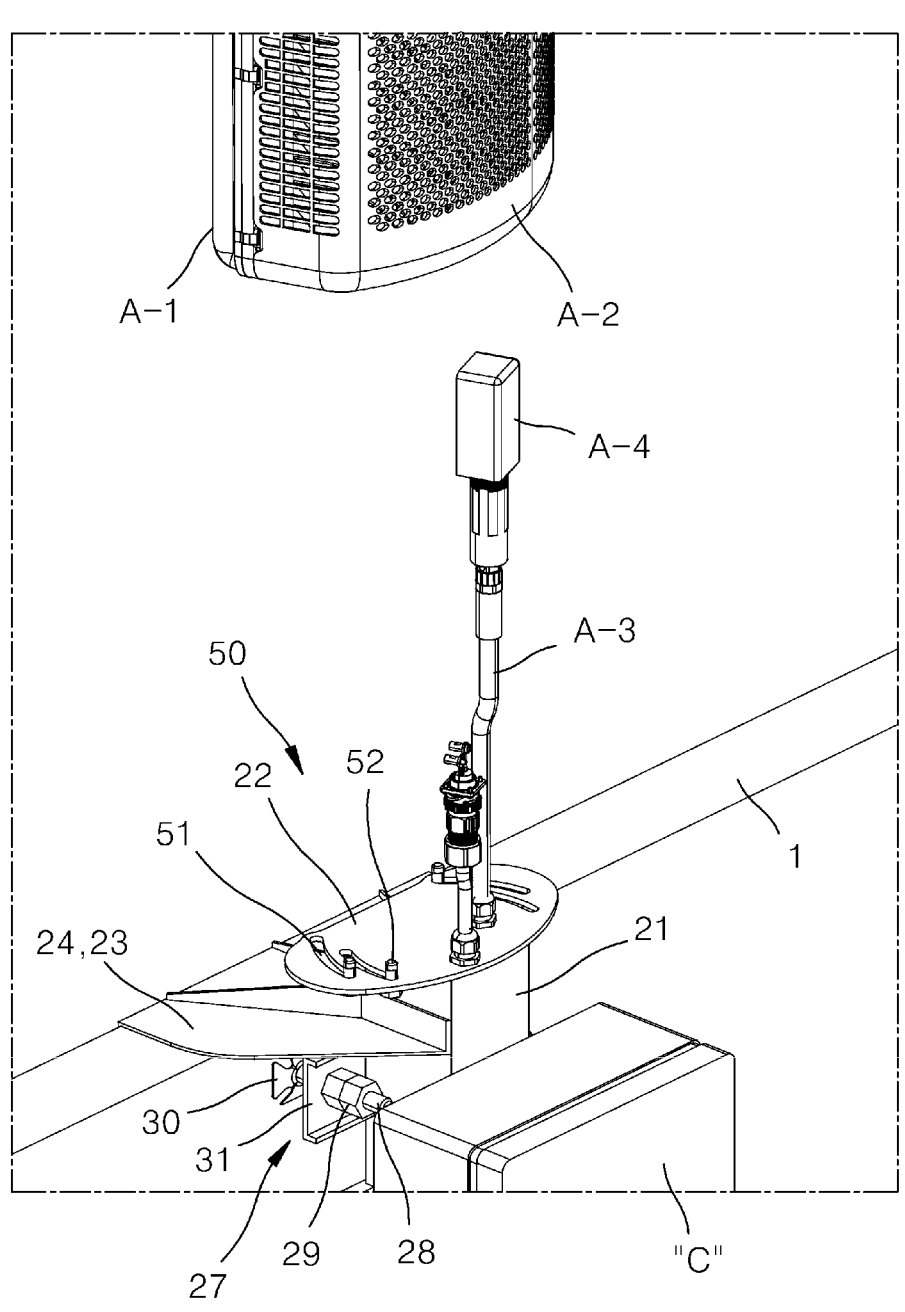

[FIG. 7B]
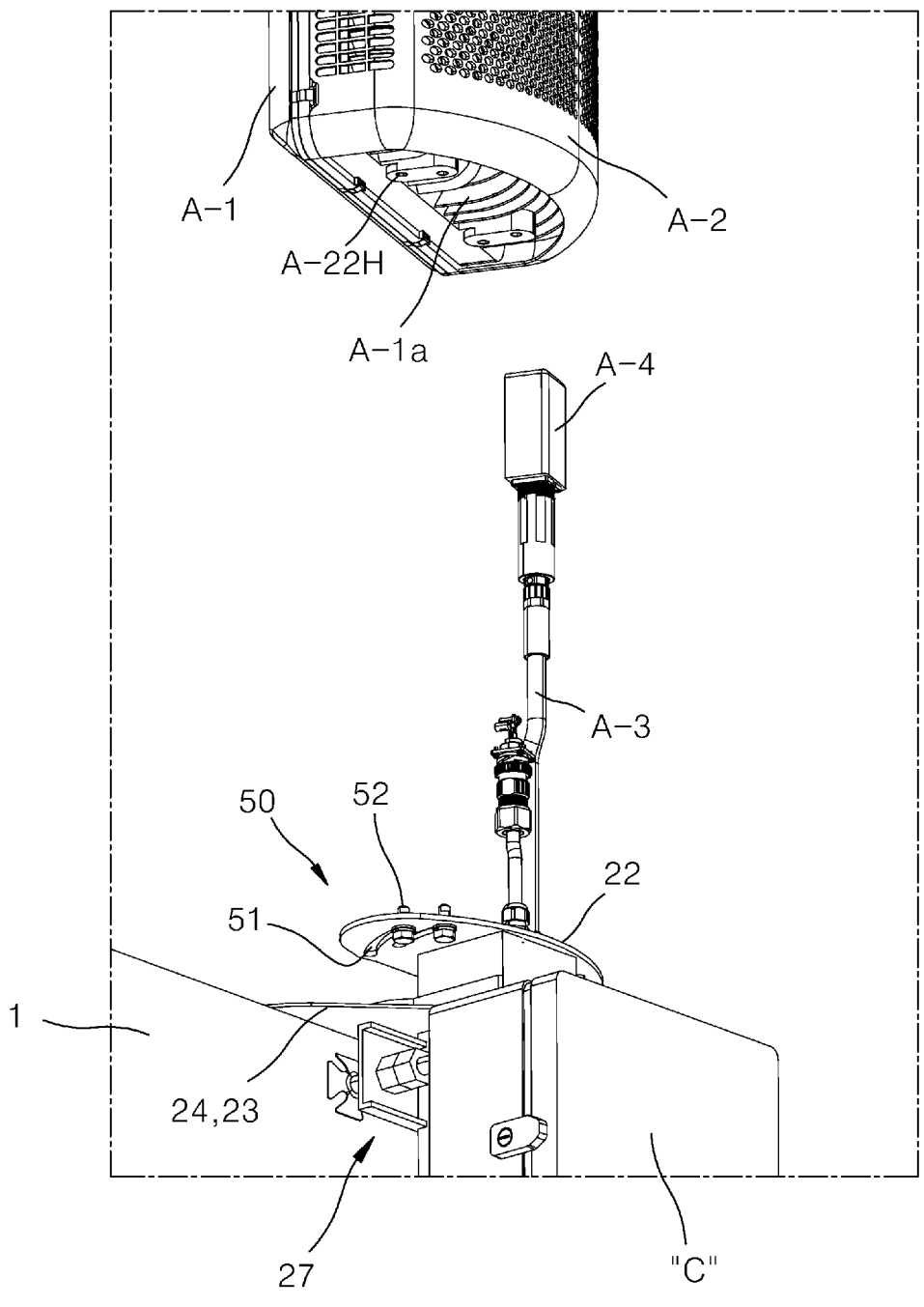

[FIG. 8]
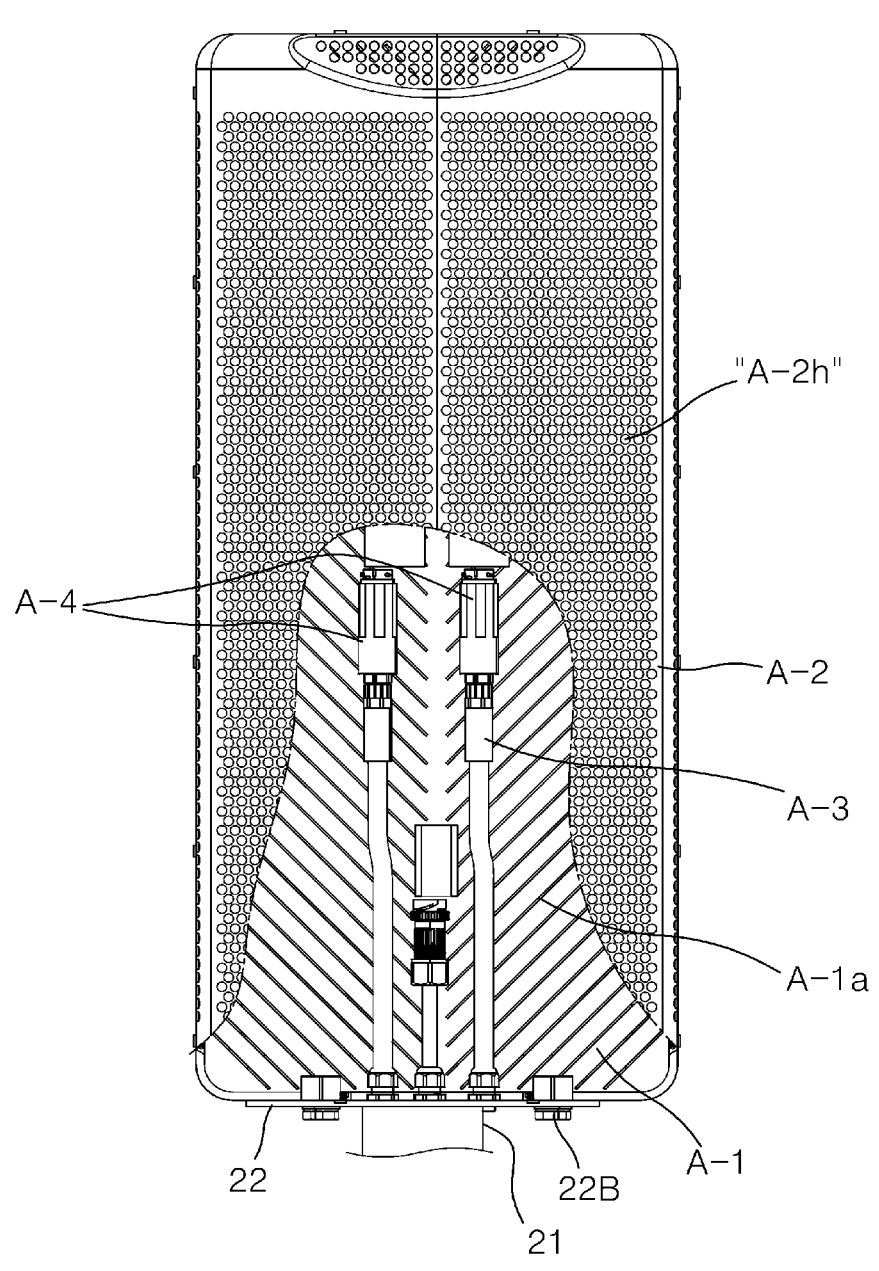

[FIG. 9]
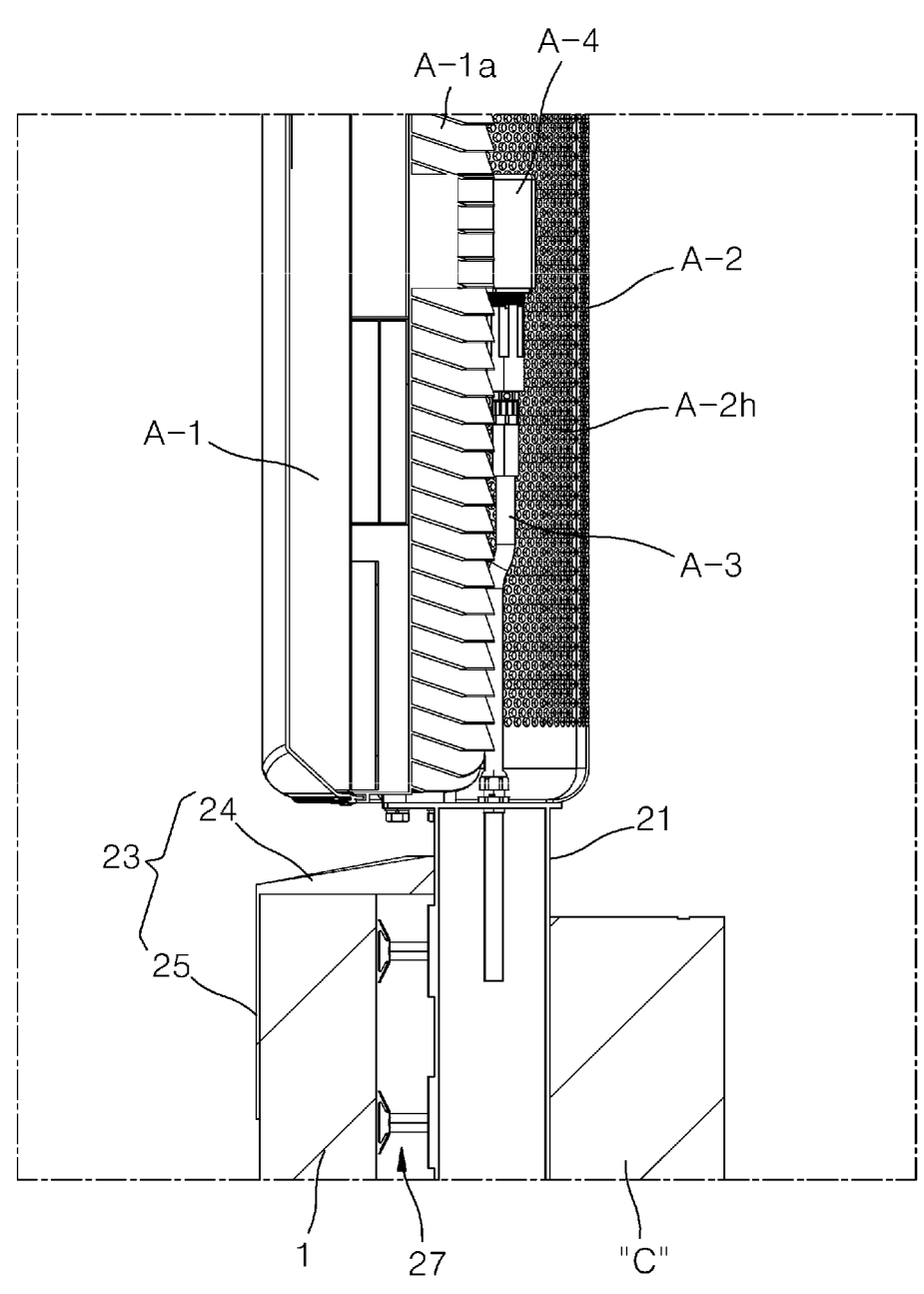

[FIG. 10]

[FIG. 11A]
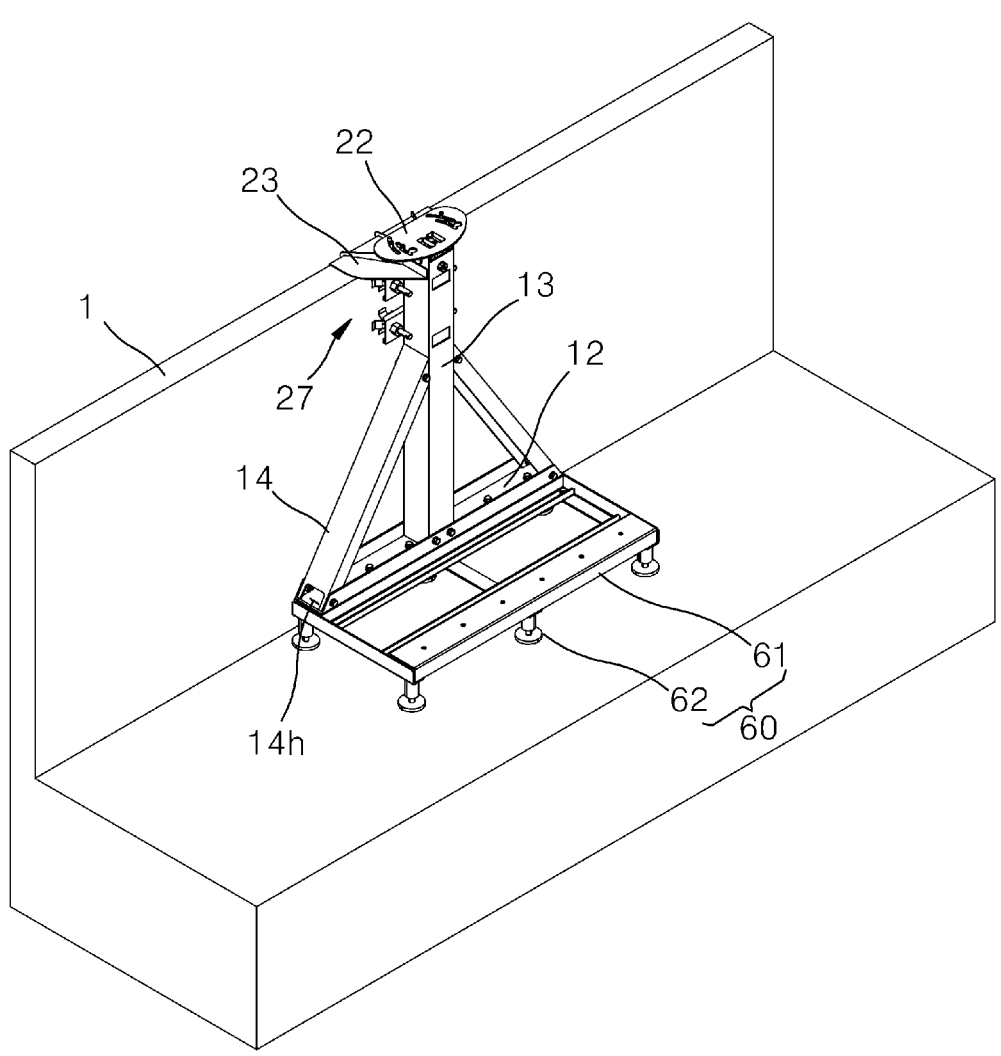

[FIG. 11B]
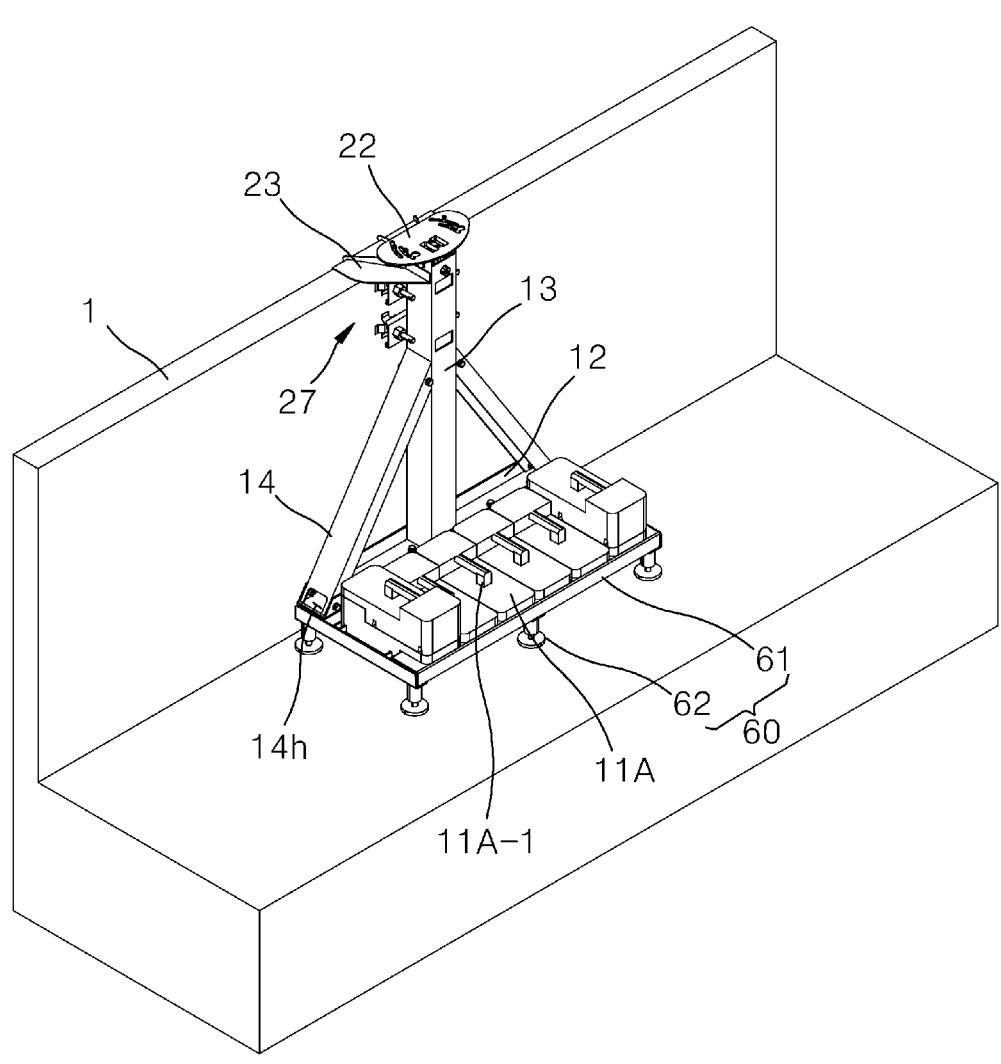

[FIG. 11C]
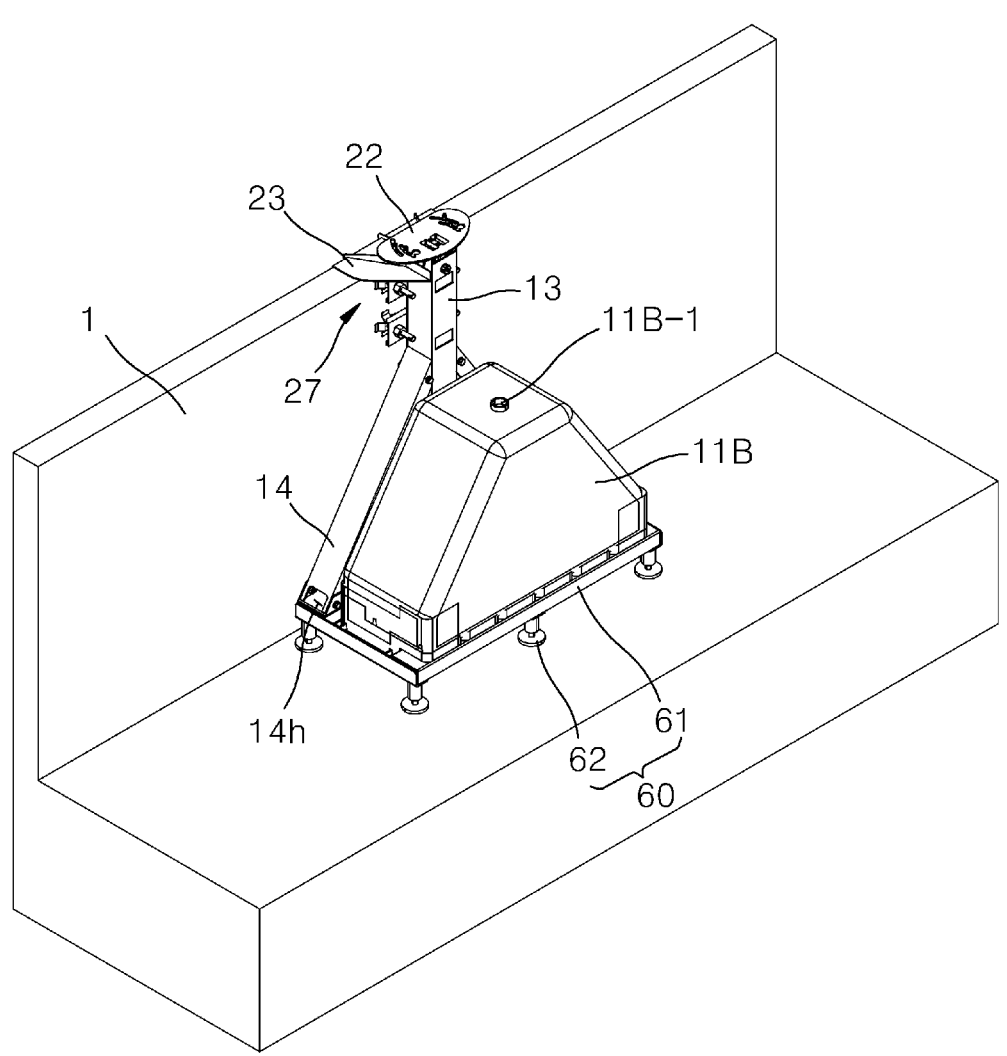

[FIG. 12]
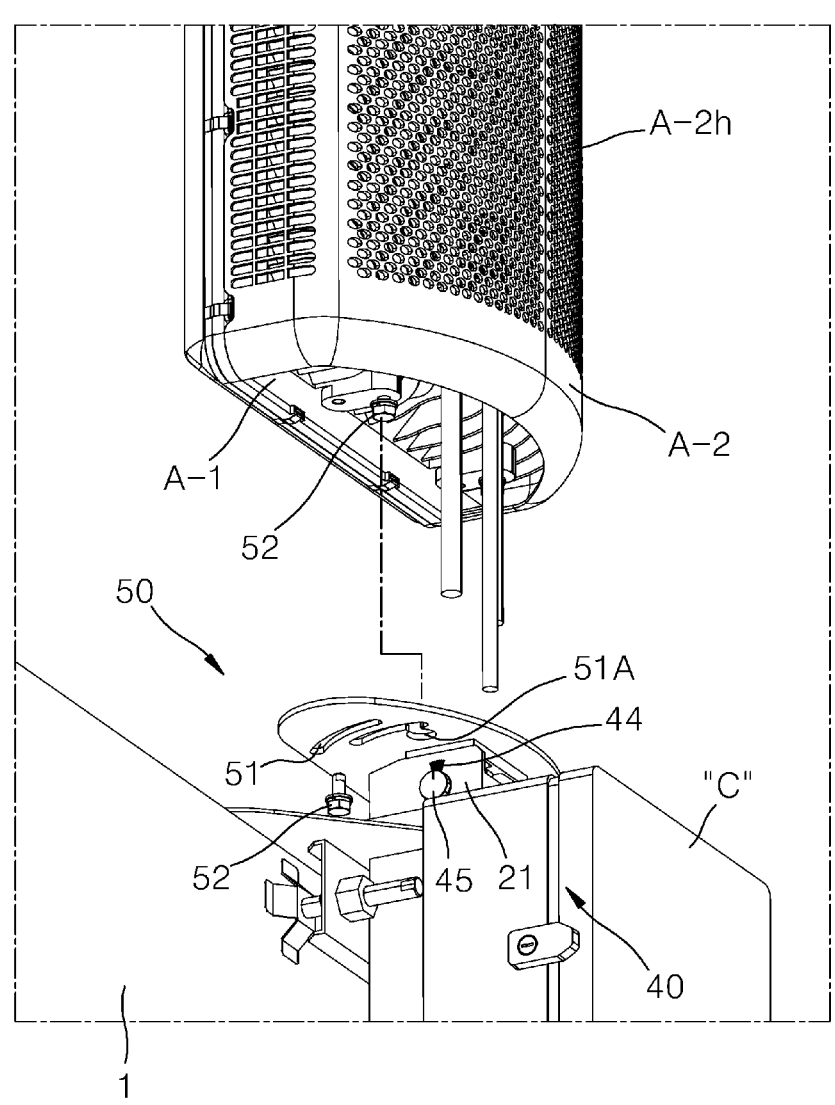

[FIG. 13]
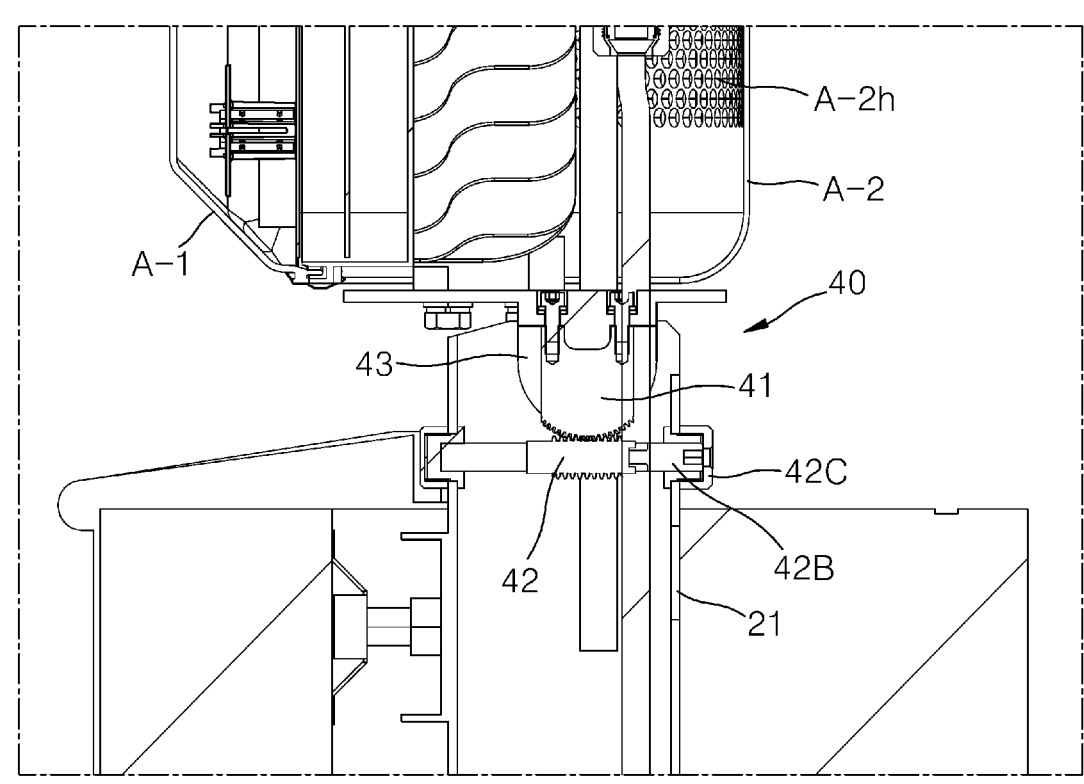

[FIG. 14]
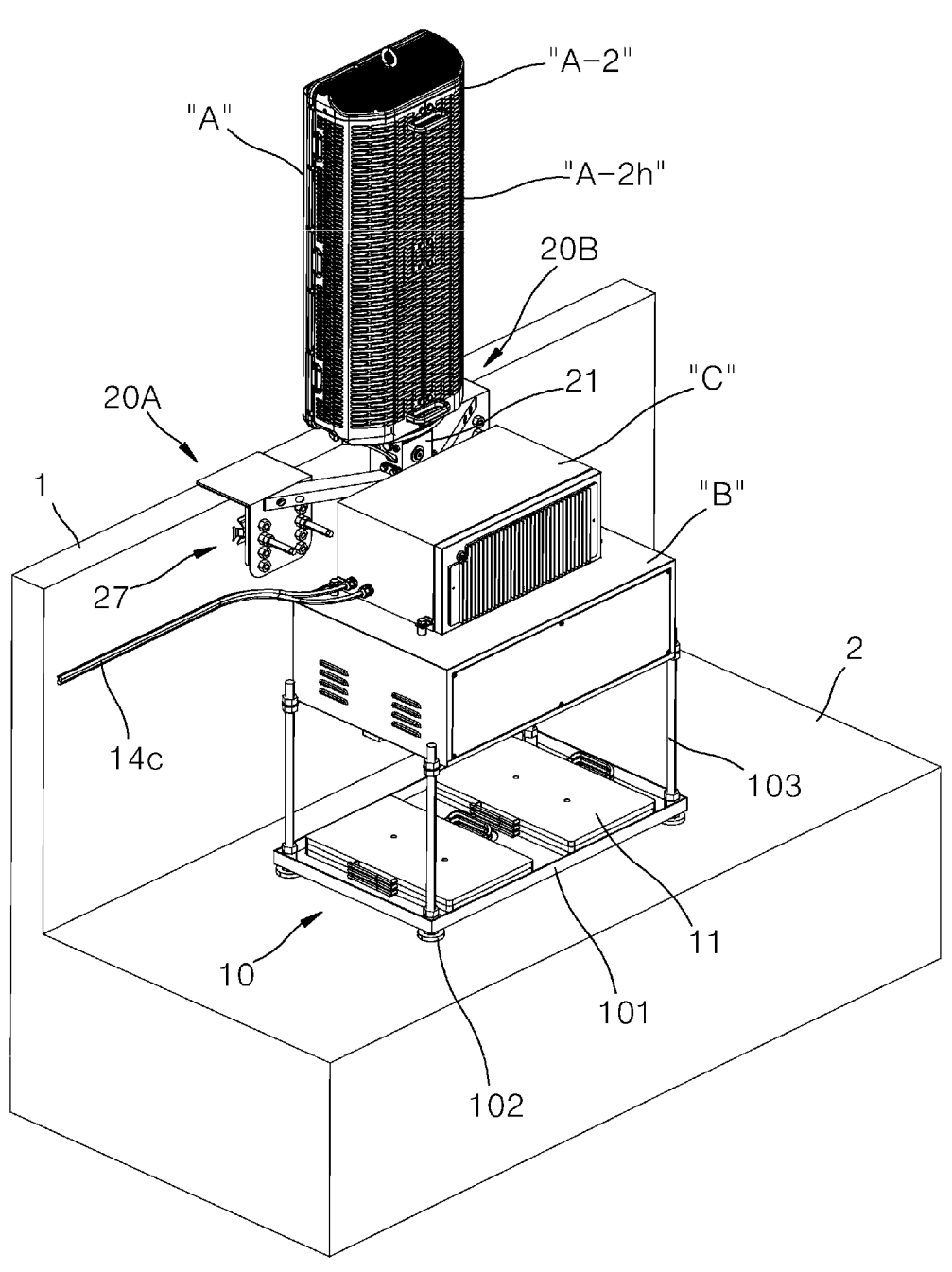

[FIG. 15]
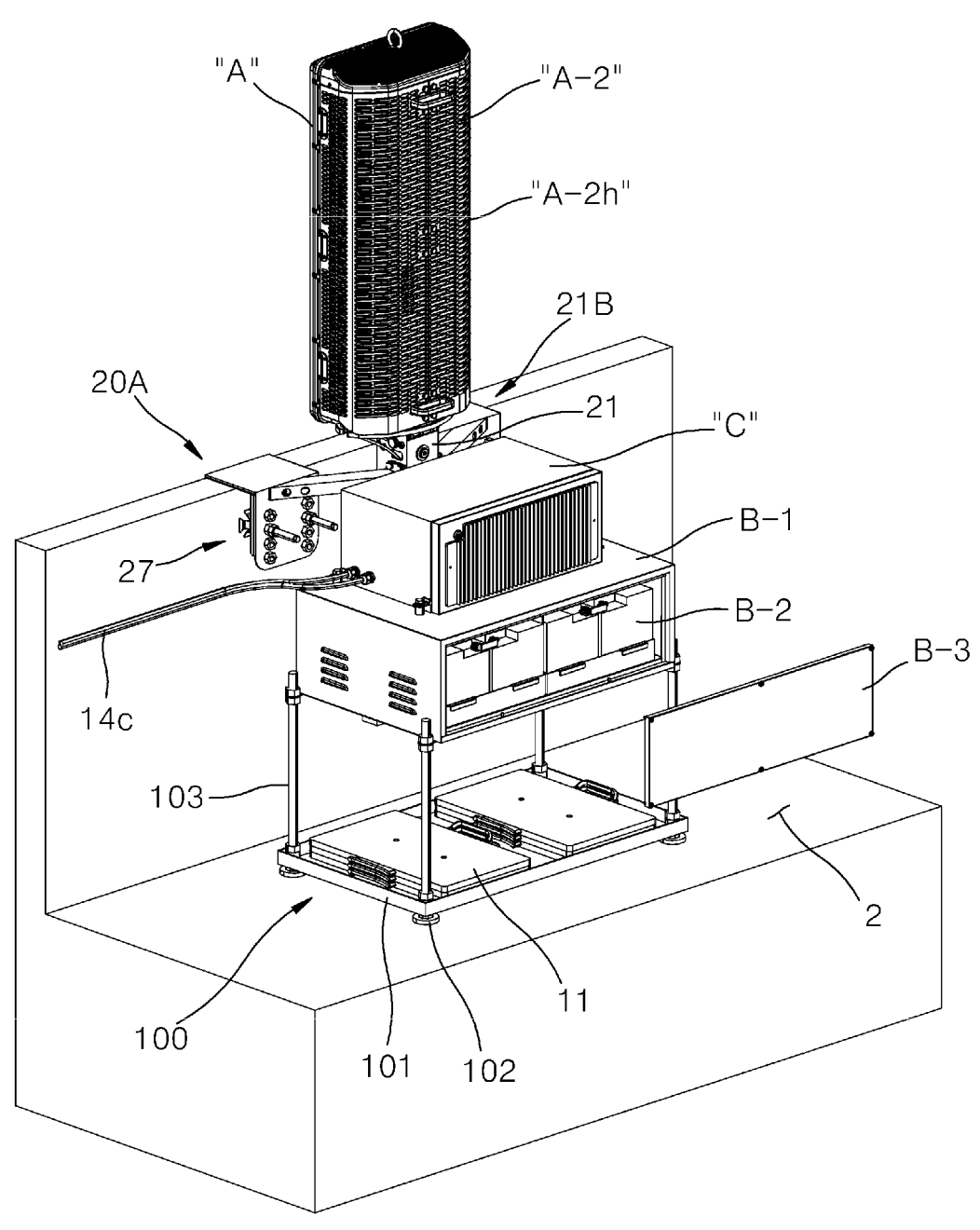

[FIG. 16A]
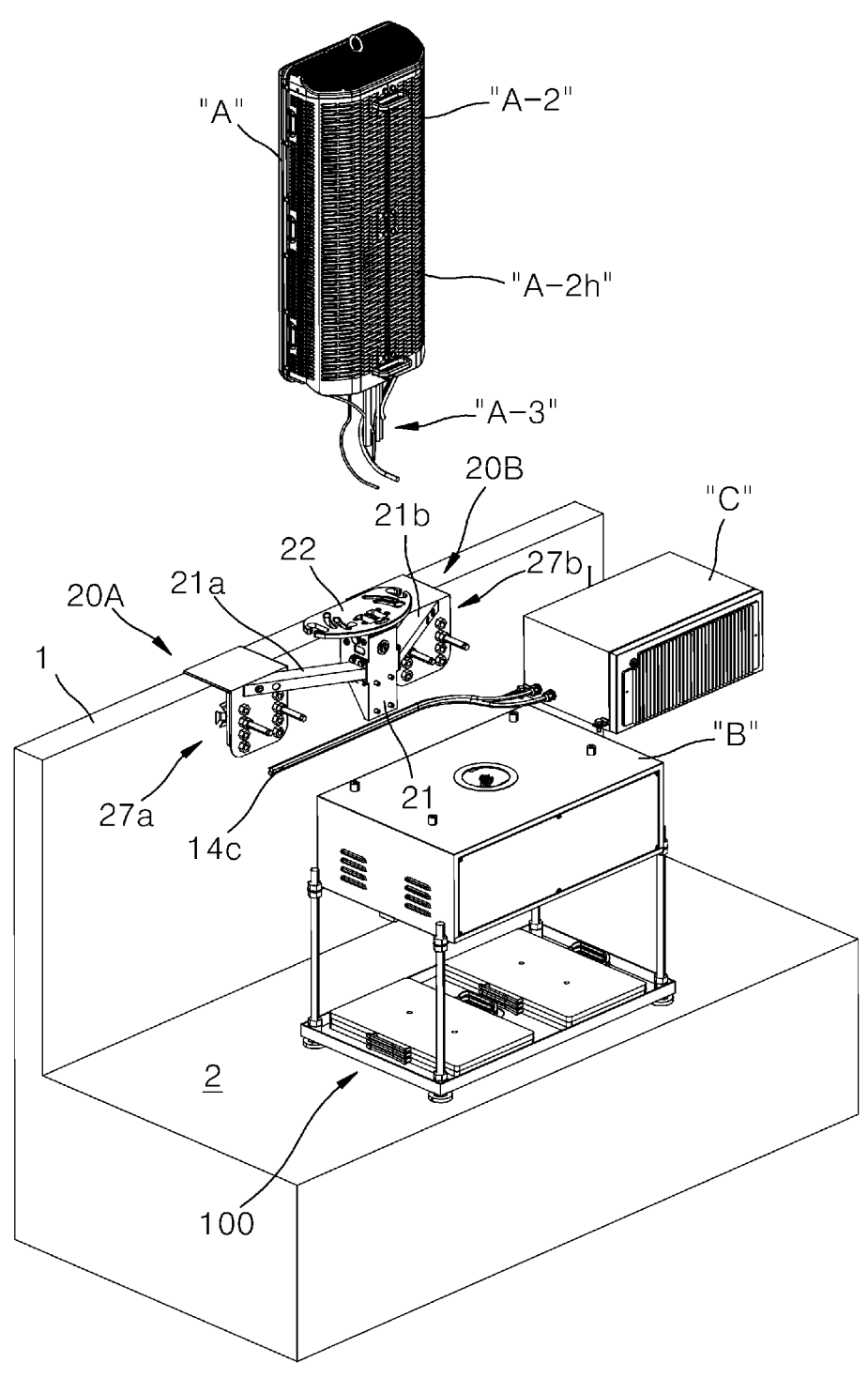

[FIG. 16B]
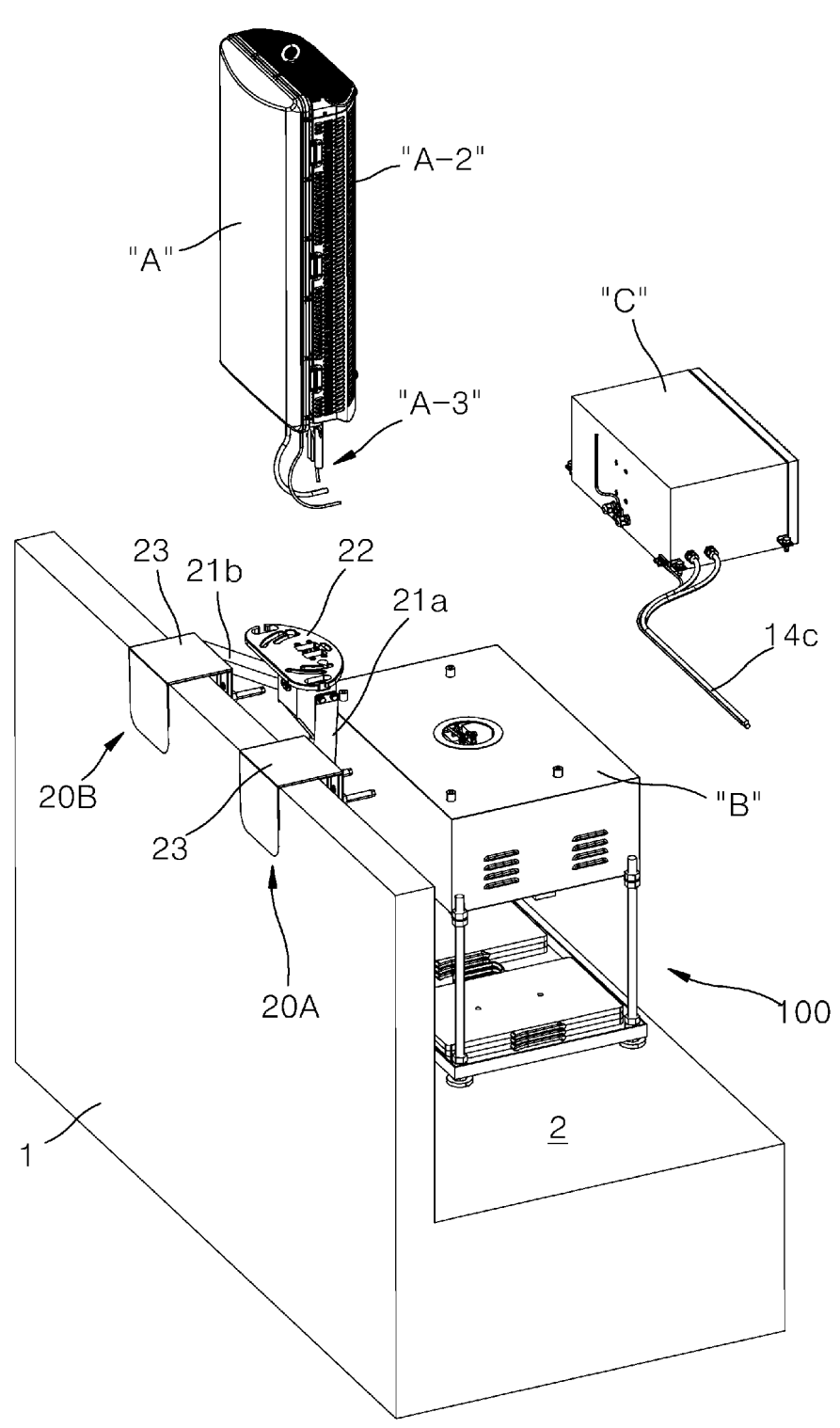

[FIG. 17]
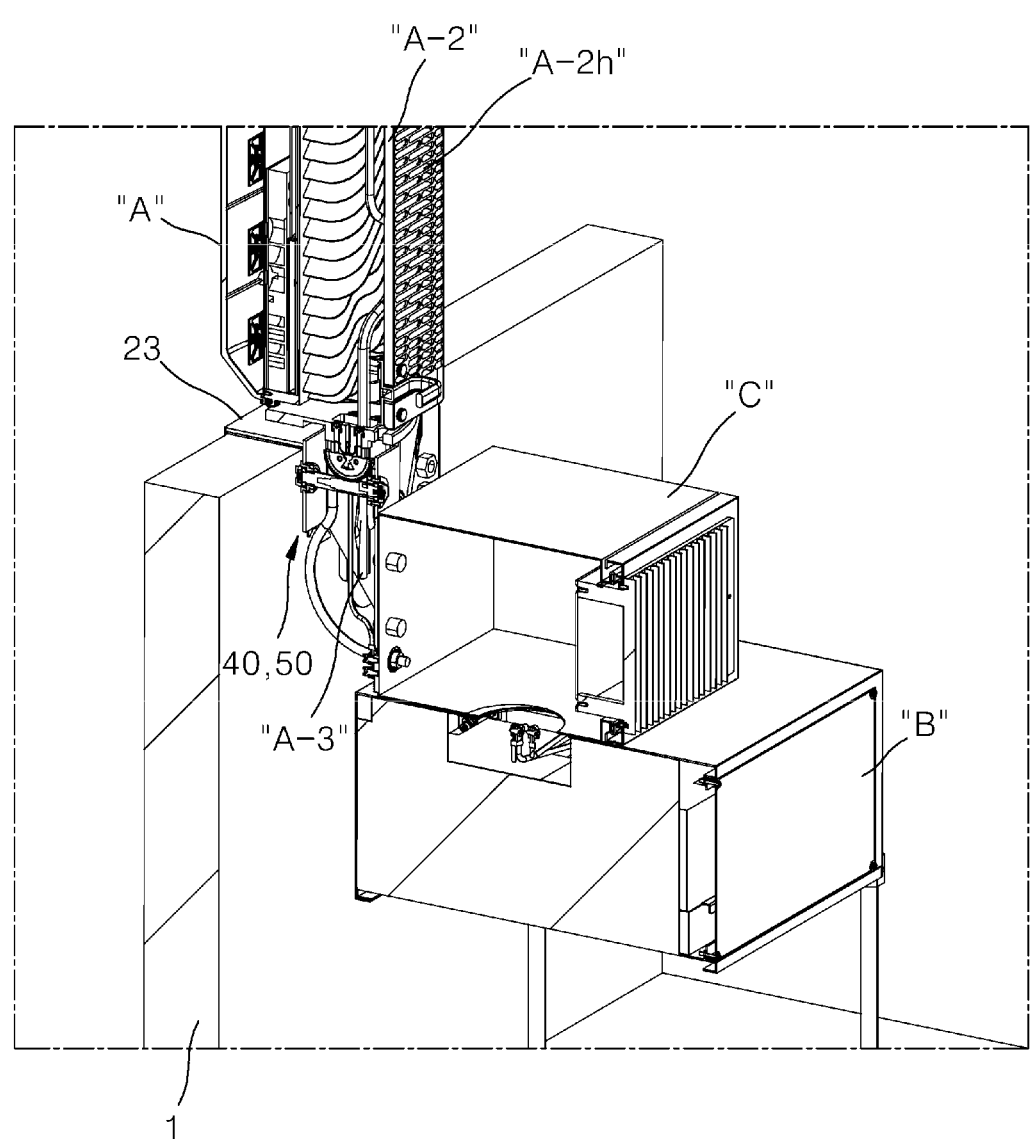

[FIG. 18]
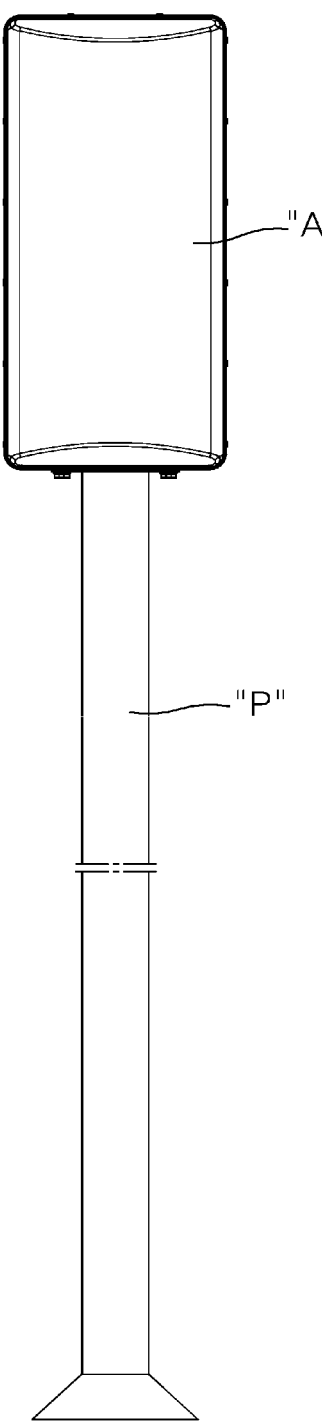

[FIG. 19]
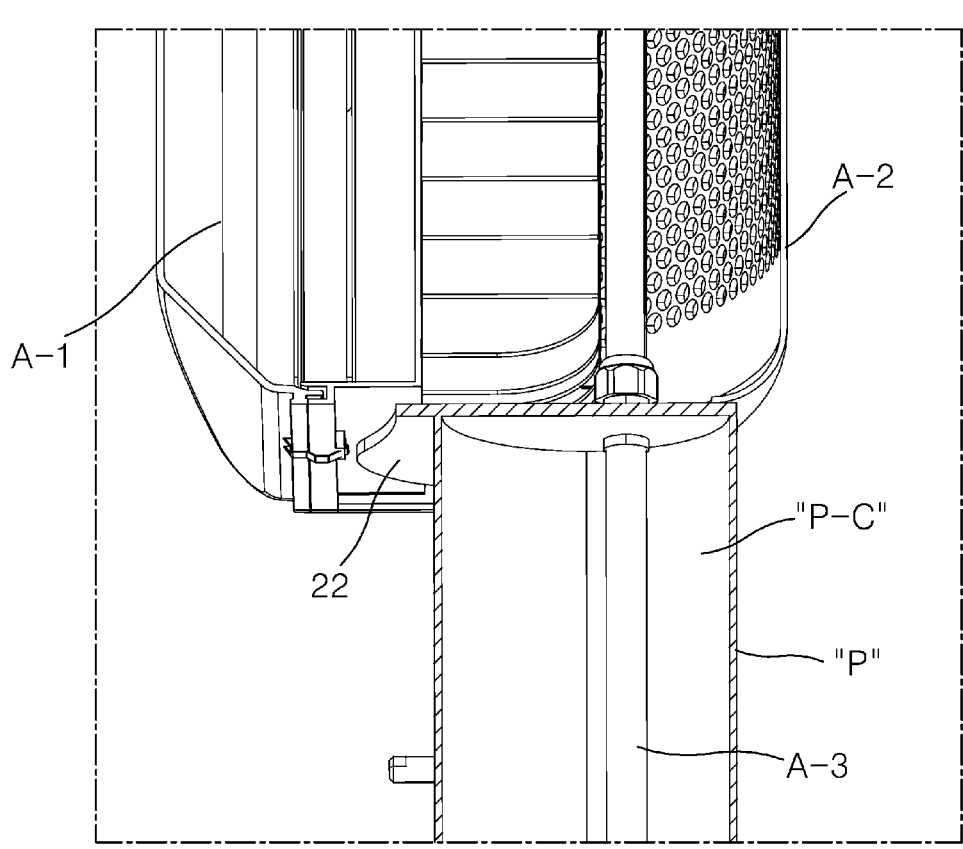

MOUNTING APPARATUS FOR ANTENNA DEVICE ON ROOFTOP

CROSS-REFERENCE TO RELATED APPLICATIONS

This application is a continuation application of International Application No. PCT/KR2022/008380, filed Jun. 14, 2022, which claims the benefit of Korean Patent Application Nos. 10-2021-0077708, filed Jun. 15, 2021; 10-2021-0079652, filed Jun. 18, 2021; 10-2021-0079653, filed Jun. 18, 2021; and 10-2022-0071539, filed Jun. 13, 2022, in the Korean Intellectual Property Office, the disclosures of which are incorporated herein in their entirety by reference.

TECHNICAL FIELD

The present disclosure relates to a mounting apparatus for an antenna device on a rooftop, and more particularly, to a mounting apparatus for an antenna device on a rooftop, which enables the antenna device to be easily installed without changes to the exterior of a building in a state where the installation height restrictions are satisfied, enables concealable installation of a cable, facilitates directivity adjustment of the antenna device, and does not require many workers during installation work.

BACKGROUND ART

It is general to install an antenna for wireless communication in a high place where the surroundings are open for smooth transmission and reception with a wireless communication device that is located far away.

For this, the antenna is installed on a utility pole, an iron tower, or a building roof (rooftop), and especially in a downtown area, the antenna is often installed on the rooftop.

In this case, in order to install the antenna on the rooftop, a method is mainly used, in which a separate support pole for supporting the antenna in an upright state is installed on the rooftop, and the antenna is fixed and installed onto the support pole.

In this case, it is often considered that the support pole is mainly fixed and installed onto the floor surface of the rooftop. However, in this case, it is required to drill into the floor of the rooftop in order to fix the support pole, and this necessarily entails the damage of the building.

Meanwhile, in installing an antenna device on the rooftop, after a heavy object is disposed on the rooftop, a support pole for supporting the antenna in an upright state is attached to the heavy object so that the support pole is supported by the heavy object.

However, in this case, a work to move the heavy object up to the rooftop is not easy, and if the heavy object does not have enough weight, the support pole may fall down due to strong wind to cause a risk of safety accidents occurring, and further, a work to raise the support pole again is not easy.

Further, in case that the antenna device is installed on the rooftop, there is an additional problem in that various kinds of legal regulations of the corresponding country must be satisfied.

DISCLOSURE

Technical Problem

The present disclosure has been devised to solve the above problems, and an object of the present disclosure is to provide a mounting apparatus for an antenna device on a rooftop, which enables the antenna device to be easily installed on a handrail of the rooftop without changes to the exterior of a building in a state where the installation height restrictions are satisfied.

Further, another object of the present disclosure is to provide a mounting apparatus for an antenna device on a rooftop, which facilitates installation of the antenna device on an upper end part of a holding pole, and enables concealable installation of a cable so as to prevent appearance beauty from deteriorating.

Also, still another object of the present disclosure is to provide a mounting apparatus for an antenna device on a rooftop, which can be installed on a rooftop by the minimal number of workers (one worker) within a short period of time without any punching tool.

In addition, still another object of the present disclosure is to provide a mounting apparatus for an antenna device, which facilitates directivity adjustment of the antenna device.

The technical problems of the present disclosure are not limited to the above-described technical problems, and other unmentioned technical problems may be clearly understood by those skilled in the art from the following descriptions.

Technical Solution

A mounting apparatus for an antenna device on a rooftop according to an embodiment of the present disclosure includes: a horizontal mounting panel coupled to a bottom surface of the antenna device; and an antenna installation part having an upper part to which the horizontal mounting panel is coupled and provided with a hollow cable installation space therein, wherein the antenna installation part includes: a support part installed on a handrail of the rooftop, disposed on a bottom surface on an inside of the handrail of the rooftop, and configured to extend upward in parallel to the handrail; and a mounting part coupled to an upper part of the support part through any one of a battery module and a control box, seated to surround an upper end part of the handrail, and having an upper end on which the antenna device is mounted.

Here, the mounting apparatus may further include a cable connected to the antenna installation part, wherein the cable is installed in a cable installation space of the antenna installation part, and is installed in a concealable manner inside a concealing cover provided to cover a rear surface of the antenna device through up and down penetration of the horizontal mounting panel.

Further, a height of the mounting part may be set to be equal to or lower than a regulation height for limiting an upper end height of the antenna device mounted on the upper end to a predetermined height from the handrail.

Further, the support part may include: a base frame on which a plurality of heavy object blocks are seated; and a corner support bar extending orthogonally upward from each corner area of the base frame, wherein the support part is connected to the mounting part through any one of the battery module coupled to an upper part of the corner support bar and the control box seated and coupled onto an upper part of the battery module.

Further, the heavy object block may be provided as a block of a metal material.

Further, the heavy object block may be provided as a plastic container in which a predetermined fluid can be filled.

Further, the mounting part may include: a mounting body having a lower end part fixed to an upper end part of the support part and an upper end at which the horizontal mounting panel coupled to a lower surface of the antenna device through bolting is provided; and a clamping panel extending from a rear part of the mounting body to be seated on the upper end part of the handrail.

Further, the clamping panel may be divided into two parts from the mounting body, and may be formed to extend in a horizontal direction inclined toward the handrail.

Further, the clamping panel may include: a horizontal seating panel extending horizontally from the mounting body toward an outside of the handrail; and an outer lock panel extending to be bent from an outer end of the horizontal seating panel downward and provided to cover an outer surface of the upper end of the handrail.

Further, the mounting apparatus may further include an antenna directivity adjustment part configured to adjust directivity of the antenna device coupled to the horizontal mounting panel.

Further, the antenna directivity adjustment part may include: a tilting means configured to tilt and rotate the antenna device by rotating a front end and a rear end of the horizontal mounting panel in forward and backward direction based on left and right horizontal axis; and a steering means configured to steer and rotate the antenna device by rotating left and right both ends of the antenna device in left and right direction based on up and down vertical axis with respect to the horizontal mounting panel.

Further, the tilting means may include: a worm wheel gear panel formed integrally with a lower surface of the horizontal mounting panel; and a worm gear part provided to be tooth-engaged with the worm wheel gear panel.

Further, the steering means may include: at least one guide slot formed to penetrate the horizontal mounting panel up and down so as to correspond to a steering rotation trajectory of the antenna device; and at least one guide bolt coupled to a lower part of the antenna device through bolting and fastened through bolting to the lower part of the antenna device by penetrating the at least one guide slot.

Advantageous Effects

According to the mounting apparatus for an antenna device according to an embodiment of the present disclosure, it is possible to easily install the antenna device on the handrail of the rooftop without changes to the exterior of the building in a state where the installation height restrictions in the corresponding country of installation are satisfied.

Further, according to the present disclosure, since it is possible to install the cable without being exposed to the outside, the appearance beauty can be improved.

In addition, according to the present disclosure, since it is possible for the minimal number of workers (one worker) to install the antenna device within a short period of time even without any punching tool, the installation costs and personnel expenses can be saved.

DESCRIPTION OF DRAWINGS

FIGS. 1A and 1B are front and rear perspective views illustrating an installation state of an antenna device using a mounting apparatus for an antenna device on a rooftop according to an embodiment of the present disclosure.

FIG. 2 is a side view of FIG. 1A.

FIG. 3 is a rear view of FIG. 1A.

FIG. 4 is a front view of FIG. 1A.

FIGS. 5A to 5C are exploded views of FIG. 1B, and in particular, a rear view and exploded perspective views in one and the other directions of FIG. 1B.

FIG. 6 is an enlarged cross-sectional view of area "가".

FIGS. 7A and 7B are exploded perspective view illustrating an area where a cable is concealed and installed.

FIG. 8 is a cutaway view of a concealing cover installed on a rear part of an antenna device, illustrating an area where a cable is concealed and installed.

FIG. 9 is a side cross-sectional view of FIG. 8.

Figure 10:
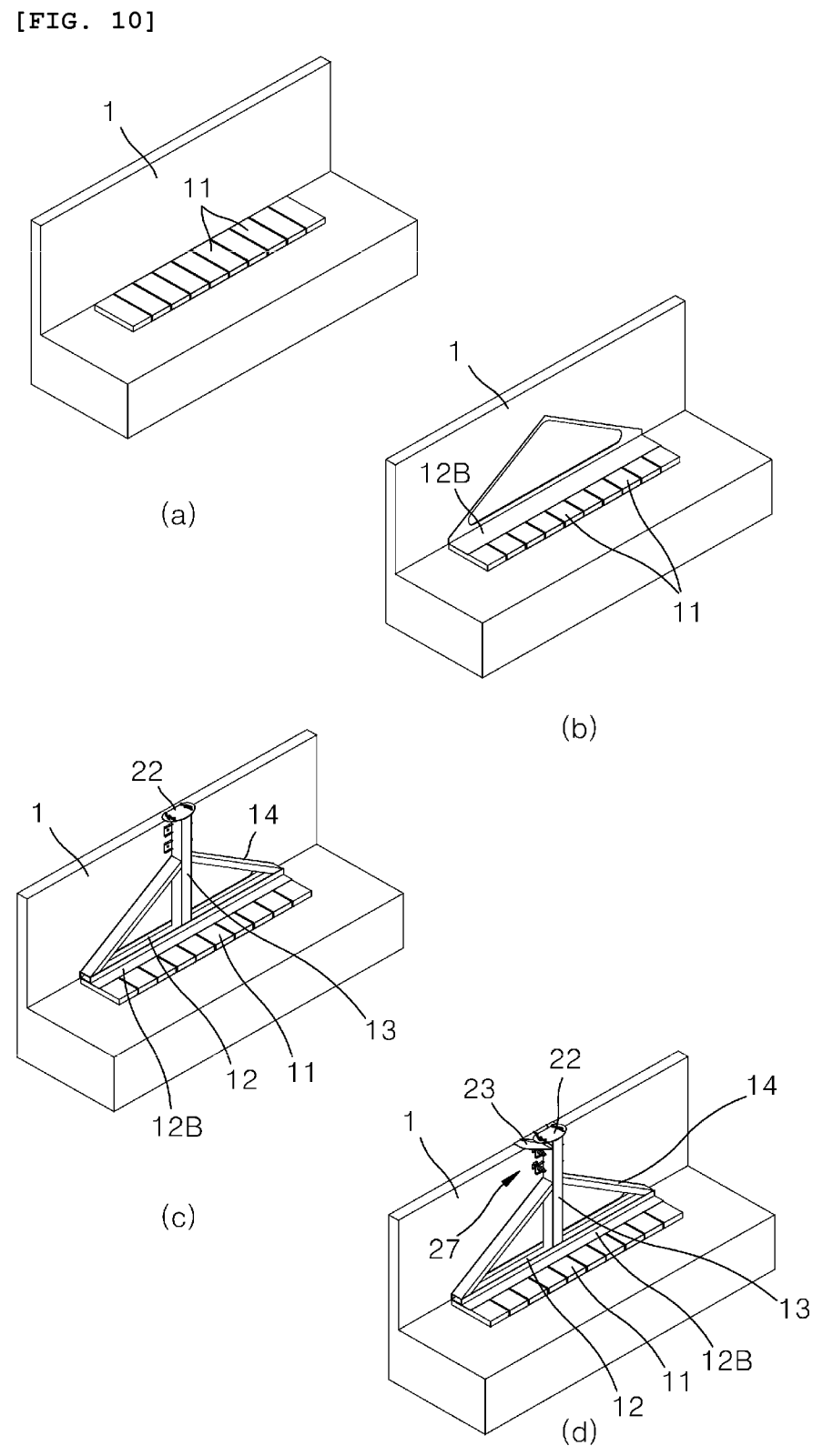

FIG. 10 is a perspective view explaining a rooftop installation process using a mounting apparatus for an antenna device on a rooftop according to an embodiment of the present disclosure.

FIG. 11A is a perspective view explaining an embodiment in which a heavy object support frame for supporting a plurality of heavy object blocks is applied among constitutions of FIG. 2.

FIGS. 11B and 11C are perspective views illustrating a plastic container and a heavy object tank as other embodiments of a plurality of heavy object blocks among constitutions of FIG. 2.

FIG. 12 is an exploded perspective view explaining an installation process of an antenna device against a horizontal mounting panel, and in particular, an exploded perspective view illustrating a steering means and a tilting means.

FIG. 13 is a cross-sectional view illustrating a tilting means of an antenna device.

FIG. 14 is a perspective view illustrating a mounting apparatus for an antenna device on a rooftop according to another embodiment of the present disclosure.

FIG. 15 is an exploded perspective view illustrating a state where a cover of a battery module among constitutions of FIG. 14 is separated.

FIGS. 16A and 16B are backward and forward direction exploded perspective views of FIG. 15.

FIG. 17 is a partial cutaway perspective view of FIG. 14.

FIGS. 18 and 19 are a front view and a partial cross-sectional view in which a support part is replaced by a general holding pole among constitutions of FIG. 2.

EXPLANATION OF SYMBOLS

| | |
|---|---|
| 1: handrail | 2: bottom surface |
| 10: support part | 11: heavy object block |
| 12: base beam | 13: support beam |
| 14: inclined beam | 20: mounting part |
| 21: mounting body | 22: horizontal mounting |
| 23: clamping panel | 24: horizontal seating |
| 25: outer lock panel | 27: vibration reduction |
| 28: clamping bolt | 29: clamping net |
| 30: leaf spring part | 40: tilting means |
| 41: worm wheel gear panel | 42: worm gear part |
| 43: guide panel | 44: tilting axis protrusion |
| 50: steering means | 51: guide slot |
| 52: guide bolt | P: holding pole |
| A: antenna device | A-1: main body |
| A-2: concealing cover | A-3: cable |
| A-4: connecting terminal | C: control box |

MODE FOR INVENTION

Hereinafter, a mounting apparatus for an antenna device on a rooftop according to an embodiment of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

FIGS. 1A and 1B are front and rear perspective views illustrating an installation state of an antenna device using a mounting apparatus for an antenna device on a rooftop according to an embodiment of the present disclosure. FIG. 2 is a side view of FIG. 1A, FIG. 3 is a rear view of FIG. 1A, and FIG. 4 is a front view of FIG. 1A. FIGS. 5A to 5C are exploded views of FIG. 1B, and in particular, a rear view and exploded perspective views in one and the other directions of FIG. 1B.

As referenced in FIGS. 1A to 5C, a mounting apparatus for an antenna device on a rooftop according to an embodiment of the present disclosure includes: a horizontal mounting panel 22 coupled to a bottom surface of the antenna device A; and an antenna installation part 10 and 20 having an upper part to which the horizontal mounting panel 22 is coupled and provided with a hollow cable installation space (not illustrated) therein.

Here, the antenna device A may further include a concealing cover A-2 provided to cover a rear surface of the antenna device A. A cable A-3 installed in the cable installation space of the antenna installation part 10 and 20 may be concealed and installed inside the concealing cover A-2 through up and down penetration of the horizontal mounting panel 22.

More specifically, as referenced in FIGS. 1 to 5B, the horizontal mounting panel 22 serves to make the cable A-3 concealed and installed in an empty space (cable installation space) inside a mounting part 21 provided vertically up and down on a handrail 1 of a rooftop (building rooftop) be not exposed to outside, but be connected to the antenna device A right away.

For this, the horizontal mounting panel 22 may be provided to be penetrated by the cable A-3 in an up and down direction, and a cable fixture 22C may be provided therein to firmly fix the cable A-3 without floating. The cable fixture 22C may be provided in the form of a fixing nut for fixing the cable A-3 that penetrates upper and lower surfaces of the horizontal mounting panel 22.

The cable A-3 that penetrates the horizontal mounting panel 22 from its lower part to its upper part may be disposed to extend inside the concealing cover A-2 provided to entirely surround a plurality of heat sink fins A-1a integrally formed with a rear part of a main body A-1 of the antenna device A.

Accordingly, the concealing cover A-2 is not necessarily provided on the antenna device A, but as in the present disclosure, it is preferable to understand that the concealing cover is a constitution which is selectively adopted only in an embodiment of the present disclosure for concealable installation of the cable A-3 that is exposed to the outside as the antenna device A installed in an open place such as a rooftop.

On the concealing cover A-2, a plurality of through-holes A-2h may be formed to facilitate heat transfer with a plurality of heat sink fins A-1a and outdoor air during heat dissipation through the plurality of heat sink fins A-1a.

Although not illustrated in the drawing, in the related art, a connecting terminal for installation of the cable is formed on a bottom surface of a main body of the antenna device, whereas in an embodiment of a mounting apparatus for an antenna device on a rooftop according to the present disclosure, the bottom surface of the main body A-1 is installed to come in direct surface contact with an upper surface of the horizontal mounting panel 22. This corresponds to the design change of the connecting terminal A-4 into the middle part of the rear surface of the main body A-1 of the antenna device A so as to prevent interferences caused by the connecting terminal A-4 during directivity adjustment of the antenna device A through a steering rotation operation to be described later.

In this case, as referenced in FIGS. 5A to 5C, the concealing cover A-2 serves to block an external exposure of the cable A-3 exposed to the rear surface of the main body A-1 of the antenna device A.

Here, the concealing cover A-2 is provided to entirely cover the rear part of the main body A-1 of the antenna device A, and after being produced separately into left and right halves, the concealing cover A-2 may be coupled to cover the left and right sides of the rear part of the main body A-1, respectively.

Further, it is preferable that the concealing cover A-2 is coupled to the rear part of the main body A-1 after the cable A-3 is connected to the rear surface of the main body A-1 of the antenna device A through the connecting terminal A-4.

Meanwhile, as reference to FIGS. 1A to 5C, the antenna installation part 10 and 20 is provided to be coupled to a handrail 1 of the rooftop (building rooftop), and may be provided as a support part 10 and a mounting part 20 to be described later.

That is, the antenna installation part 10 and 20 may include: a support part 10 installed on a handrail 1 of the rooftop, disposed on a bottom surface on an inside of the handrail 1 of the rooftop, and having one part extending upward in parallel to the handrail 1; and a mounting part 20 coupled to an upper part of the support part 10, seated to surround an upper end part of the handrail 1, and having an upper end on which the antenna device A is mounted.

Hereinafter, the mounting apparatus for an antenna device on a rooftop according to an embodiment of the present disclosure, in which the antenna installation part 10 and 20 is provided to improve ease of installation on the rooftop (building rooftop), will be described in detail.

FIG. 6 is an enlarged cross-sectional view of area " $\gamma$ ", and FIGS. 7A and 7B are exploded perspective view illustrating an area where a cable is concealed and installed. FIG. 8 is a cutaway view of a concealing cover installed on a rear part of an antenna device, illustrating an area where a cable is concealed and installed, and FIG. 9 is a side cross-sectional view of FIG. 8.

In case that a corresponding country in which the antenna device A is installed is the US, since it is possible to install the antenna device A without any separate approval if a diagonal length of the antenna device A installed on the handrail 1 of the rooftop is equal to or smaller than 3 ft, it is easy to apply the mounting apparatus for an antenna device on a rooftop according to an embodiment of the present disclosure without additional safety regulations.

Accordingly, as referenced in FIG. 1A, the height L from an upper end of the handrail 1 of the rooftop to an upper end of the antenna device A may be determined by the length in up and down direction of the antenna device A that is equal to or smaller than 3 ft.

Meanwhile, as reference in FIGS. 1A to 9, the mounting part 20 may include: a mounting body 21 having a lower end part fixed to an upper end part of a support beam 13 among the constitutions of the support part 10 and an upper end at which a horizontal mounting panel 22 coupled to a lower surface of the antenna device A through bolting is provided; and a clamping panel 23 extending to be bent from a rear part of the mounting body 21 so as to be seated on the upper end part of the handrail 1.

The mounting body 21 may be a part of the support beam 13, or may be a constitution separately manufactured and independently existing separately from the support beam 13, or may be mounted on the support beam 13 after being separately manufactured.

A control box C may be coupled to a front part of the mounting body 21. The control box C may be connected to an external wire 14C to be described later, and may serve to control the operation of the antenna device A through a cable A-3 connected to the antenna device A. A user can frequently check the state of the antenna device A through the control box C on the point that the entire up and down length of the support beam 13 including the mounting body 21 is within about 1 m.

Here, as described above, the mounting body 21 of the mounting part 20 may be provided with a cable installation space formed therein, and the cable A-3 extending from the control box C may extend up to the lower part of the horizontal mounting panel 22 through the cable installation space, and then may be installed to extend toward the antenna device A through penetration of the horizontal mounting panel 22 without being exposed to the outside.

On the rear part of the antenna device A, at least one connecting terminal A-4 for connecting the cable A-3 may be provided, and the connecting terminal A-4 may be concealed from the outside by the above-described concealing cover A-2. As described above, since the cable A-3 is installed without being exposed to the outside at least from the control box C to the antenna device A, the appearance beauty of the antenna device A can be prevented from deteriorating.

Meanwhile, as reference in FIGS. 5A to 6, a predetermined through hole 22D may be formed on the horizontal mounting panel 22 so that the cable A-3 is coupled to the connecting terminal A-4 of the antenna device A through penetration from the lower part.

For reference, a front part of the antenna device A, on which antenna elements (not illustrated) are disposed to make beamforming possible, may be disposed toward an outside of the handrail 1 of the rooftop, and on a rear part of the antenna device A, the main body A-1 integrally formed with a plurality of heat sink fins (the reference numeral thereof is not denoted) and the concealing cover A-2 disposed to entirely surround the rear part of the main body A-1 may be included.

As described above, the front part of the main body A-1, on which the antenna elements are disposed, may be disposed toward the outside of the handrail 1 of the rooftop, and the rear part of the main body A-1, on which a plurality of heat sink fins are provided, may be disposed toward the inside of the handrail 1 of the rooftop.

Here, the concealing cover A-2 serves to make it not possible that the rooftop user comes in direct contact with the plurality of heat sink fins provided on the rear part of the main body A-1 for system heat dissipation, and to make the concealable installation of the cable A-3 possible. This is because a very high system operation heat is generated during the system operation of the antenna device A, and thus the plurality of heat sink fins provided to dissipate the generated heat are in a high temperature state enough to make a contact person get a burn directly.

For this, on the concealing cover A-2, an installation jig (not illustrated) in which the cable A-3 is penetratingly installed may be provided, and a plurality of heat dissipation holes A-2h may be formed to dissipate the heat generated from the plurality of heat sink fins to the outside.

Here, the clamping panel 23 may include: a horizontal seating panel 24 horizontally extending from the mounting body 21 toward the outside of the handrail 1, and an outer lock panel 25 extending to be bent from the outer end of the horizontal seating panel 24 downward and configured to cover an outer wall of the handrail 1.

Meanwhile, the mounting part 20 may further include a vibration reduction part 27 disposed to be spaced apart for a predetermined distance in parallel to an inner wall of the handrail 1 and configured to reduce vibrations being transferred from the handrail 1. A pair of vibration reduction parts 27 may be provided on the left and right of the mounting part 20 in the up and down direction.

Here, as referenced in FIG. 6, the vibration reduction part 27 may include: a plurality of vibration reduction panels 31 formed integrally with the support part 10 to extend in the left and right horizontal direction; a plurality of clamping bolts 28 fastened to penetrate the plurality of vibration reduction panels 31 in the forward and backward direction; a leaf spring part 30 provided at one end part adjacent to the inner surface of the handrail 1 among the plurality of clamping bolts 28 and configured to be elastically supported on the inner surface of the handrail 1; and a clamping nut 29 assembled to the other end part of each of the plurality of clamping bolts 28 that is exposed to penetrate the vibration reduction panel 31.

As referenced in FIG. 6, male threads (not illustrated) may be formed on an outer periphery of the clamping bolt 28, and may be fastened in a screw connection method when penetratingly fastened to the vibration reduction panel 31, and the leaf spring part 30 may also be fastened toward a screw fastening part (the reference numeral thereof is not denoted) provided with female threads on the front end part of the clamping bolt 28 in a screw connection method.

The vibration reduction part 27 serves to make the outer lock panel 25 and the leaf spring part 30 among the constitutions of the clamping panel 23 be firmly and tightly clamped onto the inner wall and the outer wall of the handrail 1, respectively, when the clamping nut 29 is tightened.

Here, since the leaf spring part 30 being supported on the inner wall of the handrail 1 is provided to be elastically supported, the vibration reduction part 27 may also serve to reduce external vibrations, for example, such as floating or shaking of the antenna device A by wind.

In addition, an elastic support force of the leaf spring part 30 against the inner surface (inner wall) of the handrail 1 may be adjusted in accordance with the tightening direction of the clamping nut 29.

According to the mounting apparatus for an antenna device according to an embodiment of the present disclosure, since the installation of the antenna device is possible through easy height adjustment of the support part 10 of the mounting part 20 even without shape change of the rooftop and easy clamping and bolting coupling against the handrail 1 of the rooftop, the ease of installation can be improved, and various kinds of regulations in the country of installation can be satisfied.

Meanwhile, the support part 10 may include: a plurality of heavy object blocks 11 arranged in left and right direction on a bottom surface 2 on the inside of the handrail 1 of the rooftop; a base beam 12 coupled to upper surfaces of the plurality of heavy object blocks 11, and a support beam 13 extending vertically from left and right middle part (middle) of the base beam 12 and connected to the mounting part 20.

For example, if the weight of the antenna device A is 30 kg, the plurality of heavy object blocks 11 may be provided as 10 or more heavy object blocks each having 30 kg so as to firmly support the weight more than 10 times the weight of the antenna device A on the bottom surface 2 on the inside of the inner bottom surface 2 of the rooftop without floating of the antenna device A. However, the number of heavy object blocks 11 is not necessarily limited thereto, and more or less than 10 heavy object blocks 11 can also be provided in consideration of the installation environment of the installed rooftop, such as wind volume and speed.

More specifically, if it is assumed that the antenna device A having a diagonal length of 3 ft receives the front wind with a speed of 67 m/s, the front wind of 67 m/s acts as a force of 671 N, and under the condition that the height of the handrail 1 is 1 m, and a virtual moment rotation axis is located to be spaced apart for about 0.6 m from the handrail 1 along the bottom surface, the minimum weight of the heavy object blocks 11 required for the mounting apparatus for an antenna device on a rooftop according to an embodiment of the present disclosure, on which the antenna device A is mounted, is calculated as at least 265 kg as a reaction force against the rotational moment of 1006 N·m.

Accordingly, in the mounting apparatus for an antenna device on a rooftop according to an embodiment of the present disclosure, as a weight that one worker can move, the heavy object block 11 may be divided into 10 pieces of 30 kg each, and may be connected to the lower part of the base beam 12 or may be seated and fixed onto the upper part of the heavy object support frame 60.

Meanwhile, as referenced in FIGS. 2 and 3, the support part 10 may further include a joint frame 12B disposed to mediate a solid fixation between the base beam 12 and the heavy object blocks 11 and to mediate fixation of a pair of support inclined beams 14 onto the inner wall of the handrail 1.

The joint frame 12B may be formed to be bent so as to have a roughly "⌐"-shaped cross section so as to be located between the inner surface of the support inclined beam 14 and the inner wall of the handrail 1 or between the lower surface of the base beam 12 and the upper surfaces of the plurality of heavy object blocks 11 disposed on the bottom surface of the rooftop.

The joint frame 12B as described above may be provided in the form of a panel of a steel material, may be coupled to the heavy object blocks of a metal material through welding coupling or bolting coupling, and may be coupled to the rear surface of the support inclined beam 14 disposed to be inclined through welding coupling or bolting coupling.

FIG. 10 is a perspective view explaining a rooftop installation process using a mounting apparatus for an antenna device on a rooftop according to an embodiment of the present disclosure. FIG. 11A is a perspective view explaining an embodiment in which a heavy object support frame for supporting a plurality of heavy object blocks is applied among constitutions of FIG. 2, and FIGS. 11B and 11C are perspective views illustrating a plastic container and a heavy object tank as other embodiments of a plurality of heavy object blocks among constitutions of FIG. 2.

Referring to FIG. 10, an installation process of the support part 10 onto the handrail 1 of the rooftop will be briefly described as follows.

First, as referenced in (a) of FIG. 10, a plurality of heavy object blocks 11 are aligned and arranged in left and right direction on a bottom surface 2 of the rooftop adjacent to the inner surface of the handrail 1.

Then, as referenced in (b) of FIG. 10, a joint frame 12B is disposed on upper surfaces of the plurality of heavy object blocks 11.

Next, as reference in (c) of FIG. 10, the base beam 12 is disposed to be stacked in surface contact with the upper surface of the disposed joint frame 12B so that the lower surface of the base beam 12 comes in surface contact with the upper parts of the plurality of heavy object blocks 11, and the plurality of heavy object blocks 11 and the base beam 12 are coupled and fixed to each other with the joint frame 12B interposed therebetween.

Here, in case that the support beam 13 and a pair of support inclined beams 14 are integrally formed on the base beam 12, the pair of support beams 14 may also be installed together during coupling of the base beam 12 onto the joint frame 12B.

Lastly, as referenced in (d) of FIG. 10, the clamping panel 23 is installed to be seated on the upper end part of the support beam 13 while surrounding the upper end part of the handrail 1, and the vibration reduction part 27 to be described later may be installed. Here, it is safe to install the antenna device A only in a pre-assembled state so as to be able to precisely adjust the antenna device A after the antenna device A is coupled to the upper part of the horizontal mounting panel 22.

Meanwhile, the support part 10 may be fixed to the upper end part of the support beam 13 with a height that satisfies the height regulations of the antenna device A. Here, the height can be adjusted by changing the installation location of the mounting part 20 against the support beam 13.

In addition, the support part 10 may further include a pair of inclined beams 14 extending to be inclined and fixed from left and right both end parts of the base beam 12 toward the upper end part of the support beam 13. The pair of inclined beams 14 and the base beam 12 may form a kind of triangle so as to achieve a more stable support on the bottom surface 2 of the rooftop.

Meanwhile, the plurality of heavy object blocks 11 are not necessarily disposed on the lower part of the base beam 12.

That is, as reference in FIG. 11A, the support part 10 may further include a heavy object support frame 60 having a rear end part on which the base beam 12 is seated to support the entire weight and a front end part on which the plurality of heavy object blocks 11 are seated. The heavy object support frame 60 may include a frame part 61 composed of an approximately square steel frame, and a plurality of levelers 62 provided in many places on a lower part of the frame part 61 and configured to adjust horizontality of the frame part 61.

Accordingly, after the heavy object support frame 60 is mounted on the bottom surface 2 of the rooftop, the equilibrium of the frame part 61 is adjusted by using the leveler 62, and then the support inclined beam 14 and the mounting part 21 can be stably fixed and installed on the handrail 1 of the rooftop.

Meanwhile, in the mounting apparatus for an antenna device on a rooftop according to an embodiment of the present disclosure, the heavy object block 11 is not necessarily provided with a metal material.

That is, since it is enough that the heavy object block 11 is coupled to the base beam 12 or is seated on the heavy object support frame 60, and serves to support the antenna device in the direction of the bottom surface 2 of the rooftop, as referenced in FIG. 11B, the heavy object block 11 may be provided as a plastic container that can be filled with a predetermined fluid (distinguishably indicated by reference numeral "11A").

In this case, inside the heavy object block 11A provided as the plastic container, a fluid having a somewhat high specific gravity, such as water, can be filled therein, and in case of moving the heavy object block 11A, since it is possible for the worker to empty the filled fluid, to move the empty heavy object block 11A to the work site, and then to directly fill the fluid at the work site, there is no need for multiple workers.

In addition, according to the mounting apparatus for an antenna device on a rooftop according to an embodiment of the present disclosure, as referenced in FIG. 11C, it is possible to install a single heavy object tank 11B which can be filled with a predetermined fluid instead of the plurality of heavy object blocks 11 and 11A, and it is also possible to additionally stack and install the heavy object tank 11B on the upper part of the plurality of heavy object blocks 11A.

That is, the heavy object tank 11B may service to support the weight of the heavy object support frame 60 in the direction of the bottom surface 2 on the inside of the handrail 1 of the rooftop.

It is preferable that the heavy object tank 11B is provided with a high strength plastic material having a fluid accommodation part (not illustrated) in which a predetermined fluid can be filled.

In addition, a fluid supply hole 11B-1 may be formed on an upper part of the heavy object tank 11B, and thus one worker can transport a relatively light heavy object tank 11B to the work site, and then can fill the fluid therein by using a fluid supply device (e.g., water pipe) provided at the work site, thereby improving the work convenience.

Meanwhile, since the base beam 12 and the support beam 13, and the inclined beam 14 and the mounting part 21 are provided so that empty inner spaces thereof communicate with each other, and particularly, on the left and right lower end part of the support inclined beam 14, a wire insertion hole 14*h* in which an external wire 14C, such as a power cable, is installed is provided, the concealable installation is possible so that an external exposure of the external wire 14C connected to the side of the antenna device A can be completely blocked.

FIG. 12 is an exploded perspective view explaining an installation process of an antenna device against a horizontal mounting panel, and in particular, an exploded perspective view illustrating a steering means and a tilting means, and FIG. 13 is a cross-sectional view illustrating a tilting means of an antenna device.

As referenced in FIGS. 12 and 13, the mounting apparatus for an antenna device on a rooftop according to an embodiment of the present disclosure may further include an antenna directivity adjustment part 40 and 50 configured to adjust directivity of the antenna device A coupled to the horizontal mounting panel 22.

Here, the antenna directivity adjustment part 40 and 50 may include: a tilting means 40 configured to tilt and rotate the antenna device A by rotating a front end and a rear end of the horizontal mounting panel 22 in forward and backward direction based on left and right horizontal axis; and a steering means 50 configured to steer and rotate the antenna device A by rotating left and right both ends of the antenna device A in left and right direction based on up and down vertical axis with respect to the horizontal mounting panel 22.

In particular, the antenna device A may be coupled to the horizontal mounting panel 22 to steer and rotate in the left and right direction against the horizontal mounting panel 22 by the steering means 50.

Here, the steering means 50 may include: at least one guide slot 51 formed to penetrate the horizontal mounting panel 22 up and down so as to correspond to a steering rotation trajectory of the antenna device A; and at least one guide bolt 52 coupled to a lower part of the antenna device A through bolting and fastened through bolting to the lower part of the antenna device A by penetrating the at least one guide slot 51.

The guide bolt 52 is provided in a bolt type that is fastened to at least one bolt fastening hole A-22H (refer to FIG. 7B) provided on the lower surface of the antenna device A through penetration of the guide slot 51 on the side of the antenna device A on the lower part of at least four places of the horizontal mounting panel 22, and when the directivity of the antenna device A is adjusted through steering rotation in the left and right direction, the guide bolt 52 makes stable rotation possible in consideration of the guide slot 51 as a predetermined rotation trajectory.

In particular, as referenced in FIG. 12, at least left and right pairs of guide bolts 22B are pre-installed on the antenna device A, and after steering in the left and right direction of the antenna device A is adjusted through seating of the guide slot 51 on the side of an installation groove part 51A into which a head portion of the guide bolt 52 is inserted, the remaining pair of guide bolts 52 may be firmly fixed to the lower end part of the antenna device A by fastening the remaining pair of guide bolts 52 onto the lower end part of the antenna device A through penetration of the guide bolt 52 through the guide slot 51.

Meanwhile, as referenced in FIG. 13, the mounting apparatus for an antenna device on a rooftop according to an embodiment of the present disclosure may be further provided with a tilting means 40 configured to adjust the up and down direction tilting of the antenna device A installed on the horizontal mounting panel 22.

That is, in the mounting apparatus for an antenna device on a rooftop according to an embodiment of the present disclosure, the tilting means 40 may serve to tilt and rotate the antenna device A by rotating the front end and the rear end of the horizontal mounting panel 22 in the forward and backward direction based on the left and right horizontal axis (the reference numeral thereof is not denoted).

As referenced in FIG. 13, the tilting means 40 may include: a worm wheel gear panel 41 formed integrally with a lower surface of the horizontal mounting panel 22; and a worm gear part 42 disposed to penetrate the front and rear of the mounting part 21 horizontally to be tooth-engaged with the worm wheel gear panel 41 and having gear teeth formed on an outer periphery thereof.

Here, a rotation angle adjustment bolt 42B is coupled to the front end part of the worm gear part 42, and a user who adjusts a tilting rotation amount of the antenna device A can precisely adjust a tilting rotation angle of the antenna device A by rotating the rotation angle adjustment bolt 42B in the left and right direction. The rotation angle adjustment bolt 42B may be shielded by a bolt shielding cap 42C in normal times.

In addition, on the left and right sides of the worm wheel gear panel 41, a guide panel 43 provided to come in contact with an inner periphery of the mounting part 21 may be provided, and on each of outsides of the guide panel 43, a tilting axis protrusion 45 that is inserted into left and right horizontal axis (the reference numeral thereof is not denoted) formed on the left and right of the mounting part 21 may be provided.

As described above, if tilting in the up and down direction is necessary after the antenna device A is installed on the upper surface of the horizontal mounting panel 22 in a state where the steering adjustment in the left and right direction is completed, the worker can adjust the tilting angle by rotating the worm gear part 42 protruded to the front end part of the mounting part 21 in the left and right direction by using a separate tool.

On the outer surface of the mounting part 21 corresponding to the outside of the tilting axis protrusion 45 exposed to the left and right outer surfaces of the mounting part 21, a tilting angle reference line (the reference numeral thereof is not denoted) may be printed, and on the mounting part 21 corresponding to the surroundings of the tilting axis protrusion 45, a tilting angle indicating part 44 may be printed, so that the worker can precisely adjust the tilting of the antenna device A while visually checking the tilting degree in the up and down direction of the antenna device A using the tilting means 40.

As described above, according to the mounting apparatus for an antenna device according to an embodiment of the present disclosure, since the installation of the antenna device is possible through easy height adjustment of the support part 10 of the mounting part 20 even without shape change of the rooftop and easy clamping and bolting coupling against the handrail 1 of the rooftop, the ease of installation can be improved, and various kinds of regulations in the country of installation can be satisfied.

FIG. 14 is a perspective view illustrating a mounting apparatus for an antenna device on a rooftop according to another embodiment of the present disclosure, and FIG. 15 is an exploded perspective view illustrating a state where a cover of a battery module among constitutions of FIG. 14 is separated. FIGS. 16A and 16B are backward and forward direction exploded perspective views of FIG. 15, and FIG. 17 is a partial cutaway perspective view of FIG. 14.

As referenced in FIGS. 14 to 17, the mounting apparatus for an antenna device on a rooftop according to another embodiment of the present disclosure has a difference in that a support part 100 is different from that according to an embodiment of the present disclosure as described above with reference to FIGS. 1 to 13.

More specifically, the support part 100 may include: a base frame composed of an approximately square frame shape and having an upper part on which a plurality of heavy object blocks 11 are seated; and a corner support bar 103 extending orthogonally upward from each corner area of the base frame 101.

On each upper end or upper end part of four corner support bars 103, a battery module B composed of a cuboidal enclosure shape having at least one built-in battery may be installed.

The battery module B may include a battery accommodation box B-1, a plurality of batteries B-2 accommodated in the battery accommodation box B-1, and a box cover B-3 configured to open or close the battery accommodation box B-1.

Here, the battery module B may serve to supply an emergency power so that the operation of the antenna device A is not interrupted in case of emergency such as unannounced outage or failure of an external power being supplied to the antenna device A.

Meanwhile, according to the mounting apparatus for an antenna device on a rooftop according to an embodiment of the present disclosure, the support beam 13 among the constitutions of the support part 10 is directly connected to the mounting body 21 of the mounting part 20, whereas according to the mounting apparatus for an antenna device on a rooftop according to another embodiment of the present disclosure, the support part 100 and the mounting part 20 are not directly coupled to each other, but may be coupled to each other through any one of the battery module B and the control box C stacked and coupled thereto.

That is, the control box C may be firmly coupled to the upper surface of the battery module B through bolting, and one surface of the battery module B that is directed toward the handrail 1 of the control box C may be firmly coupled to the front surface of the mounting body 21 of the mounting part 20 through bolting.

Here, the cable A-3 may be wire-designed to be connected to the antenna device A through an inner space of the mounting body 21 without being exposed to outside after penetrating the one surface of the control box C.

In addition, in the mounting apparatus for an antenna device on a rooftop according to another embodiment of the present disclosure, the mounting part 20A and 20B, that is, the clamping panel 23, may be divided into two parts in a "V" shape from the mounting body 21, and may be formed to extend in a horizontal direction inclined toward the handrail.

Accordingly, as compared to an embodiment of the present disclosure in which a single number of clamping panel 23 is provided, a stable resistance force can be provided against an external force in the horizontal direction.

In addition, since vibration reduction part 27a and 27b is provided with respect to each clamping panel 23, it is possible to prevent shaking or a gap caused by the wind pressure (external force) through the antenna device A more effectively, and to double the vibration reduction function.

Meanwhile, in the mounting apparatus for an antenna device on a rooftop according to another embodiment of the present disclosure, it is preferable that an external wire 14C connected to an external power provided to operate the antenna device A is wire-designed to be directly connected to the control box C without passing through the support part 100, and is fixed to an inner wall of the handrail 1 other than the bottom surface 2 of the rooftop as possible so as to minimize inconvenience such as interruption by a rooftop installer and user.

As described above, according to the mounting apparatus for an antenna device on a rooftop according to another embodiment of the present disclosure, by adding own weights of the battery module B and the control box C to the weight of the plurality of heavy object blocks 11, the weight of the antenna device A installed on the rooftop can be effectively supported, and thus it is possible to install the antenna device A more stably.

Meanwhile, although not illustrated in the drawing, the external exposure of the battery module B and the control box C, which is not desirable, can be blocked from the outside by using a shielding box (not illustrated) that can entirely cover the upper parts of the battery module B and the control box C.

FIGS. 18 and 19 are a front view and a partial cross-sectional view in which a support part is replaced by a general holding pole among constitutions of FIG. 2.

In the mounting apparatus for an antenna device on a rooftop according to an embodiment of the present disclosure, as referenced in FIGS. 18 and 19, the horizontal mounting panel 22 can be provided on an upper end part of a general holding pole P.

In this case, on the point that the steering means 50 can be implemented on the horizontal mounting panel 22, it may be possible to adjust the directivity of the antenna device A in accordance with the left and right steering rotation of the antenna device A through the horizontal mounting panel 22. This is because it is possible to adjust the antenna directivity in the left and right direction of the antenna device A through the guide bolt 52 in the guide slot 51 on the upper part of the horizontal mounting panel 22.

Meanwhile, as referenced in FIGS. 18 and 19, in installing the cable A-3 through an inner cable installation space P-C that is an empty space of the holding pole, the cable A-3 can be concealed and installed on the side of the main body A-1 of the antenna device A on the upper part thereof through the horizontal mounting panel 22.

As described above, according to an embodiment of the mounting apparatus for an antenna device on a rooftop according to the present disclosure, in a state where the installation location of the cable A-3 in the related art, which acts as a factor that deteriorates the appearance beauty, with respect to the main body A-1 of the antenna device A is changed, and the main body A-1 of the antenna device A is seated and installed on the upper surface of the horizontal mounting panel 22, the cable A-3 is concealed and installed inside the mounting part 21 and the holding pole P, and the cable A-3 extending toward the upper part of the horizontal mounting panel 22 is also designed so that the exposure of the cable A-3 is completely shielded by using the concealing cover A-2 of the antenna device A, so that the appearance beauty of the antenna device A can be prevented from deteriorating.

As above, a mounting apparatus for an antenna device on a rooftop according to an embodiment of the present disclosure has been described in detail with reference to the accompanying drawings. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be determined by the appended claims.

INDUSTRIAL APPLICABILITY

The present disclosure provides a mounting apparatus for an antenna device on a rooftop, which enables the antenna device to be easily installed on a handrail of the rooftop without changes to the exterior of a building in a state where the installation height restrictions are satisfied, facilitates installation of the antenna device on an upper end part of a holding pole, and enables concealable installation of a cable so as to prevent appearance beauty of the antenna device from deteriorating.

The invention claimed is:

1. A mounting apparatus for an antenna device on a rooftop, the mounting apparatus comprising:
   a horizontal mounting panel coupled to a bottom surface of the antenna device; and
   an antenna installation part having an upper part to which the horizontal mounting panel is coupled and provided with a hollow cable installation space therein,
   wherein the antenna installation part includes:
   a support part installed on a handrail of the rooftop, disposed on a bottom surface on an inside of the handrail of the rooftop, and configured to extend upward in parallel to the handrail; and
   a mounting part coupled to an upper part of the support part, seated to surround an upper end part of the handrail, and having an upper end on which the antenna device is mounted,
   wherein the battery module or the control box is interposed between the support part and the mounting part so as to mechanically couple the support part and the mounting part, and the mounting part includes a horizontal seating surface disposed on an upper surface of the handrail and configured to directly support the horizontal mounting panel.

2. The mounting apparatus of claim 1, further comprising a cable connected to the antenna installation part,
   wherein the cable is installed in a cable installation space of the antenna installation part, and is installed in a concealable manner inside a concealing cover provided to cover a rear surface of the antenna device,
   the cable passing upward and downward through a vertical cable passage formed in the horizontal mounting panel.

3. The mounting apparatus of claim 2, wherein a height of the mounting part is set to be equal to or lower than a regulation height for limiting an upper end height of the antenna device mounted on the upper end to a predetermined height from the handrail.

4. A mounting apparatus for an antenna device on a rooftop, the mounting apparatus comprising:
   a horizontal mounting panel coupled to a bottom surface of the antenna device; and
   an antenna installation part having an upper part to which the horizontal mounting panel is coupled and provided with a hollow cable installation space therein,
   wherein the antenna installation part includes:
   a support part installed on a handrail of the rooftop, disposed on a bottom surface on an inside of the handrail of the rooftop, and configured to extend upward in parallel to the handrail; and
   a mounting part coupled to an upper part of the support part through any one of a battery module and a control box, seated to surround an upper end part of the handrail, and having an upper end on which the antenna device is mounted,
   wherein the support part comprises:
   a base frame on which a plurality of heavy object blocks are seated; and
   a corner support bar extending orthogonally upward from each corner area of the base frame.

5. The mounting apparatus of claim 4, wherein the heavy object block is provided as a block of a metal material.

6. The mounting apparatus of claim 4, wherein the heavy object block is provided as a plastic container in which a predetermined fluid can be filled.

7. The mounting apparatus of claim 1, wherein the mounting part comprises:

a mounting body having a lower end part fixed to an upper end part of the support part and an upper end at which the horizontal mounting panel coupled to a lower surface of the antenna device through bolting is provided; and a clamping panel extending from a rear part of the mounting body to be seated on the upper end part of the handrail.

8. The mounting apparatus of claim 7, wherein the clamping panel is divided into two parts from the mounting body, and is formed to extend in a horizontal direction inclined toward the handrail.

9. The mounting apparatus of claim 7, wherein the clamping panel comprises:

a horizontal seating panel extending horizontally from the mounting body toward an outside of the handrail; and an outer lock panel extending to be bent from an outer end of the horizontal seating panel downward and provided to cover an outer surface of the upper end of the handrail.

10. The mounting apparatus of claim 1, further comprising an antenna directivity adjustment part configured to adjust directivity of the antenna device coupled to the horizontal mounting panel.

11. The mounting apparatus of claim 10, wherein the antenna directivity adjustment part comprises:

a tilting means configured to tilt and rotate the antenna device by rotating a front end and a rear end of the horizontal mounting panel in forward and backward direction based on left and right horizontal axis; and a steering means configured to steer and rotate the antenna device by rotating left and right both ends of the antenna device in left and right direction based on up and down vertical axis with respect to the horizontal mounting panel.

12. The mounting apparatus of claim 11, wherein the tilting means comprises:

The mounting apparatus of claim 11, wherein the tilting means a worm wheel gear panel formed integrally with a lower surface of the horizontal mounting panel; and a worm gear part provided to be tooth-engaged with the worm wheel gear panel.

13. The mounting apparatus of claim 11, wherein the steering means comprises:

at least one guide slot formed to penetrate the horizontal mounting panel up and down so as to correspond to a steering rotation trajectory of the antenna device; and at least one guide bolt coupled to a lower part of the antenna device through bolting and fastened through bolting to the lower part of the antenna device by penetrating the at least one guide slot.

14. The mounting apparatus of claim 4, wherein the battery module or the control box is interposed between the corner support bar and the mounting part so as to mechanically connect the support part and the mounting part.

\* \* \* \* \*